United States Patent
Schwalb et al.

(12)

(10) Patent No.: US 6,256,595 B1
(45) Date of Patent: Jul. 3, 2001

(54) APPARATUS AND METHOD FOR MANUALLY SELECTING, DISPLAYING, AND REPOSITIONING DIMENSIONS OF A PART MODEL

(75) Inventors: Edward Schwalb; Elena Pashenkova; Dmitry Leshchiner, all of Irvine; Kensuke Hazama, Yorba Linda, all of CA (US)

(73) Assignee: Amada Company, Limited, Kanagawa-Ken (JP)

( * ) Notice: Subject to any disclaimer, the term of this patent is extended or adjusted under 35 U.S.C. 154(b) by 0 days.

(21) Appl. No.: 09/034,356

(22) Filed: Mar. 4, 1998

(51) Int. Cl.$^7$ .................................................. G06F 17/50
(52) U.S. Cl. ............................. 703/1; 700/182; 707/502; 345/964
(58) Field of Search .................................. 345/349, 419; 395/500.1, 500.28; 703/22; 707/502

(56) References Cited

U.S. PATENT DOCUMENTS

| | | | |
|---|---|---|---|
| 4,855,939 | * | 8/1989 | Fitzgerald, Jr. et al. ............ 395/119 |
| 5,548,707 | * | 8/1996 | LoNegro et al. .................... 707/502 |
| 5,729,750 | * | 3/1998 | Ishida ................................. 707/502 |
| 5,771,044 | * | 6/1998 | Cragun et al. ...................... 345/420 |
| 5,929,856 | * | 7/1999 | LoNegro et al. .................... 345/349 |
| 6,025,846 | * | 2/2000 | Chudley ............................. 345/419 |

* cited by examiner

Primary Examiner—Kevin J. Teska
Assistant Examiner—Lonnie A. Knox
(74) Attorney, Agent, or Firm—Greenblum & Bernstein, P.L.C.

(57) ABSTRACT

A dimensioning system is provided for a computer generated model of a sheet metal part including a plurality of entities. The dimensioning system comprises a model display, an indicator, a selector, a dimension defining system, and a dimension display. The model display displays a representation of the model on a display screen. The indicator indicates to a user candidate entities of the model, in response to user events, that may be selected. The selector selects two entities of the model, based on an indicated candidate entity. The dimension defining system defines each dimension associated with the selected entities of the model. The dimension display displays dimension information on the display screen based on the defined dimension. A repositioning system is also provided for a computer generated model of a sheet metal part represented on a display screen. The sheet metal part has associated dimensions displayed along with the sheet metal part on the display screen. The repositioning system comprises a repositioner and a repositioned dimension display. The repositioner repositions the dimension to a desired position relative to the model. The repositioned dimension display displays the dimension at the desired position relative to the model.

26 Claims, 25 Drawing Sheets

Zoom Window

APPARATUS AND METHOD FOR MANUALLY SELECTING, DISPLAYING, AND REPOSITIONING DIMENSIONS OF A PART MODEL

BACKGROUND OF THE INVENTION

1. Field of the Invention

The present invention relates to computer aided design (CAD) systems and computerized drafting tools for designing and modeling parts, such as sheet metal parts. More particularly, the invention relates to an apparatus and method for selecting, displaying and repositioning dimensions of a CAD part model on a display screen.

2. Background Information

Traditionally, the production of bent sheet metal components at, for example, a progressive sheet metal manufacturing facility, involves a series of production and manufacturing stages. The first stage is a design stage during which a sheet metal part design is developed based on a customer's specifications. The customer will typically place an order for a particular sheet metal component to be produced at the facility. The customer's order will usually include the necessary product and design information so that the factory may manufacture the component. This information may include, for example, the geometric dimensions of the part, the material required for the part (e.g., steel, stainless steel or aluminum), special forming information, the batch size, the delivery date, etc. The sheet metal part requested by the customer may be designed and produced for a wide variety of applications. For example, the produced component may ultimately be used as an outer casing for a computer, an electrical switchboard, an arm rest in an airplane, or a part of a door panel for a car.

During the design stage, the design office of the manufacturing facility may develop a sheet metal part design using an appropriate Computer Aided Design (CAD) system. Based on the customer's specifications, the CAD system may be utilized to develop a two-dimensional (2-D) model of the sheet metal part. Typically, the customer will provide a blueprint containing one or more drawings of the component and the critical geometric dimensions of the part. The dimensions are used to quantitatively describe the part geometry. The blueprint may also indicate any special formings or markings to be included in the part, such as the location of holes or other types of openings on the surface(s) of the sheet metal part. A CAD system operator will often use this blueprint to develop a 2-D model on the CAD system. The 2-D model may include a view of the flat sheet metal part that will be folded into the finished 3-D part, and one or more other orthographic views of the sheet metal part displaying bend line and/or dimensional information.

In recent years, the use and development of 2-D and three-dimensional (3-D) modeling in commercially available CAD/Computer Aided Manufacturing (CAM) systems have facilitated the process of modeling bent sheet metal components. The CAD system operator and part designer can now utilize both the 2-D and 3-D representations to better understand the geometry of the part and more efficiently develop a part design. In particular, the relationships between certain locations of the part that are significant (for example, because the part must fit into a defined location or space according to a specified, orientation) may now be modeled and analyzed. Thus, the use of 2-D and 3-D modeling has reduced the time and effort required to analyze a part and determine whether the dimensions of the part will permit the part to fit into defined locations or environments.

Prior to computer modeling, the part was physically measured after bending and then rebent if the part did not meet the specifications, resulting in a time consuming trial and error process for obtaining an optimal design.

Until now, modeling programs had limited capabilities because they only displayed predetermined dimensions of a part. In other words, the distances between certain predetermined entities (i.e., bend lines, faces, arcs and lines (edges) of the part) were automatically displayed. However, these automatic dimensions may not be the critical dimensions of the part or may not have even existed before the part was folded. Moreover, automatically displaying dimensions, typically causes too many dimensions to be displayed on the screen, causing a cluttered screen. Clutter occurs because automatic dimensions are an all or nothing proposition, i.e., either all of the dimensions are displayed or none are displayed. Thus, there is a need for tools which allow the user to decide which dimensions of a part are important, and select those dimensions for calculating and displaying. An additional need exists for allowing a user to prioritize the important dimensions for display and/or reposition the dimensions so that the screen does not appear cluttered. It follows, that when a user selects and prioritizes dimensions to display, time and effort goes into the selection. Consequently, a need exists for saving these dimensions in association with the part to capture the user's knowledge about the part.

A further need exists for selecting desired entities of a part from which to measure the dimension, without requiring tedious mouse manipulation. Typically, most of the prior systems use 2-D models or 3-D paper models, i.e., models without thickness. However, in the real world, parts have thickness. Consequently, when a part is bent, the thickness comes into play and affects dimensions. Thus, a need exists for selecting which side of the metal thickness, (i.e., the far or close side), the dimension is to be measured from. Furthermore, a need also exists to permit easily selecting a desired entity, especially when a multitude of entities exist.

SUMMARY OF THE INVENTION

The invention relates to a dimensioning system for a computer generated geometric model having at least one entity. The entity may be a bend line, face or forming. The dimensioning system includes a selector which selects two entities of the model and a dimension defining system which defines each dimension associated with the selected entities of the model. An indicator may be provided which indicates to a user candidate entities of the model that may be selected. Consequently, each entity is selected based on an indicated candidate entity. The candidate entities are indicated in response to user events, preferably mouse movement events. The dimensioning system may also include a model display which displays a representation of the model on a display screen, and a dimension display which displays dimension information on the display screen based on the defined dimension. The geometric model may be a sheet metal part model or a 3-D sheet metal part model.

The selector may include an attachment point selector which selects an attachment point corresponding to each selected entity. The dimension defining system includes a cuboid generator which generates a cuboid defined by the selected attachment points as opposite diagonal corners of the cuboid. The dimension between the attachment points is defined as either a straight line connecting the attachment points or as three adjacent edges of the cuboid. The three adjacent edges connect the attachment points. Alternatively, a rectangle generator may be used, in which case the dimension is defined as the two adjacent edges between the attachment points.

When the dimension between the selected entities is an angle measured between two lines, the selector may also include a line calculator which calculates the two lines, one for each selected entity. Each line represents one of the two selected entities. The dimension display includes a cylinder generator which generates a cylinder based upon the two lines. A dimension information component is displayed on a portion of a perimeter of the cylinder. Alternatively, the dimension information component may be an arc connecting the two selected entities, alleviating the need for a cylinder generator.

Also provided is a picking order system which assigns priorities to the model's entities and predefined dimension of the model. Based upon the assigned priorities, the picking order system picks either one of the model's entities or the predefined dimension as a target for selecting. If the target is an entity of the model, the target is the candidate entity. A filter, which prevents an undesirable one of the model's entities or predefined dimension from becoming the target, may also be provided.

The dimension display includes a visibility checker which checks whether both attachment points are visible from a user selected perspective of the model. Dimension information is only displayed if one of the attachment points is determined to be visible from the user selected perspective. The dimension information includes text and an arrow line. The dimension display also includes a text repositioner which repositions the text to be centered relative to a portion of the arrow line visible from the user selected perspective.

The invention also relates to a method for selecting and displaying dimensions for a computer generated geometric model having a plurality of entities. The method includes displaying a representation of the model on a display screen, and indicating to a user candidate entities of the model in response to user events. The user events are preferably mouse movement events. The method also includes selecting two of the model's entities with each entity being based on an indicated candidate entity, The method also includes defining dimensions associated with the selected entities of the model, and displaying, along with the model, the dimension information on the display screen, based on the defined dimension. The geometric model may be a sheet metal part model or a 3-D sheet metal part model.

Defining includes defining the dimension as either an angle between the selected entities or as a distance between the selected entities. If the dimension is defined as the distance between the selected entities, the defining also includes selecting a measurement axis along which to measure the distance. If the dimension is defined as an angle between the selected entities, the defining also includes selecting either an obtuse measuring angle or an acute measuring angle.

If the dimension is defined as the distance between the selected entities, the selecting also includes selecting an attachment point corresponding to each selected entity. Defining dimensions also includes generating a cuboid defined by the selected attachment points as opposite diagonal corners of the cuboid. The dimension between the attachment points are defined as either a straight line connecting the attachment points or as three adjacent edges of the cuboid. The three adjacent edges connect the attachment points. Alternatively, a rectangle may be generated, in which case the dimension is defined as two adjacent edges between the attachment points.

If the dimension is defined as an angle, the selecting also includes calculating two lines, one for each selected entity. Each line represents one of the two selected entities. Displaying the dimension also includes generating a cylinder based upon the two lines. The dimension between the two selected entities is an angle measured between the two lines. A dimension information component is displayed on a portion of a perimeter of the cylinder. Alternatively, no cylinder may be used and the dimension information component may be an arc between the two selected entities.

A sheet metal thickness in the model may be represented. When the thickness is represented defining also includes selecting a side of the thickness from which to measure the dimension.

The invention also relates to a repositioning system for a computer generated geometric model represented on a display screen. The geometric model has associated dimensions displayed along with the geometric model on the display screen. The repositioning system includes a repositioner which repositions the dimension to a desired position relative to the model, and a repositioned dimension display which displays the dimension at the desired position relative to the model. The geometric model may be a sheet metal part model or a 3-D sheet metal part model. The repositioned dimension display includes an extension line creator. The extension line creator creates and displays extension lines on the display screen if the arrow line has been repositioned so that the closest end is no longer adjacent to the selected entity. The extension lines extend between each attachment point and the closest end of an arrow line.

The invention also relates to a dimensioning system for a computer generated model of a sheet metal part including at least one entity. The dimensioning system includes a model display which displays a representation of the model on a display screen, and an indicator which indicates to a user candidate entities of the model that may be selected. The candidate entities are indicated in response to user events. Also included is a selector which selects two entities of the model. Each entity selected is based upon an indicated candidate entity. Also included is a dimension defining system which defines each dimension associated with the selected entities of the model, and a dimension display which displays dimension information on the display screen based on the defined dimension. The system also includes a repositioner which repositions the dimension to a desired position relative to the model, and a repositioned dimension display which displays the dimension at the desired position relative to the model.

The invention also relates to a single entity dimensioning system for a computer generated geometric model having at least one entity. The single entity dimensioning system includes a model display which displays a representation of the model on a display screen, and an indicator which indicates to a user candidate entities of the model that may be selected. The candidate entities are indicated in response to user events. Also included is a selector which selects two entities of the model. Each entity selected is based upon an indicated candidate entity. Also included is a dimension defining system which defines each dimension associated with the selected entities of the model, and a dimension display which displays dimension information on the display screen based on the defined dimension. The system also includes a repositioner which repositions the dimension to a desired position relative to the model, and a repositioned dimension display which displays the dimension at the desired position relative to the model. The geometric model may be a sheet metal part model or a 3-D sheet metal part model. If the selected entity is either a circle or an arc, the dimension is either a diameter of the selected entity or a radius of the selected entity. If the selected entity is a bend line or a line, the dimension is the length of the selected entity.

BRIEF DESCRIPTION OF THE DRAWINGS

The present invention is further described in the detailed description which follows, by reference to the noted drawings by way of non-limiting examples of preferred embodiments of the present invention, in which like reference numerals represent similar parts throughout the several views of the drawing, and wherein.

DETAILED DESCRIPTION OF THE PREFERRED EMBODIMENTS

Referring now to the accompanying drawings, a detailed description of the dimensioning system is provided. According to an aspect of the present invention, an apparatus and method are provided for selecting, displaying and repositioning dimensions of a part model. According to the present invention, an apparatus and method are provided for enabling a user to select any two entities of a part model in order to display an angle or distance relationship (the dimension) between the two entities. The user may then edit the dimension and/or reposition it in order to obtain an optimal view of the part and its related dimensions. Although the following description generally refers to dimensions associated with three dimensional (3-D) models, the dimensioning features may be easily applied to two dimensional (2-D) models as well.

The features of the present invention may be used in a wide variety of CAD part modeling environments. For example, the invention may be implemented in the exemplary environment according to the class diagram of FIG. 1 using C++, or any other object oriented programming language. The system may run under Microsoft Windows NT 4.0 using IBM PC clones.

Figure 1:
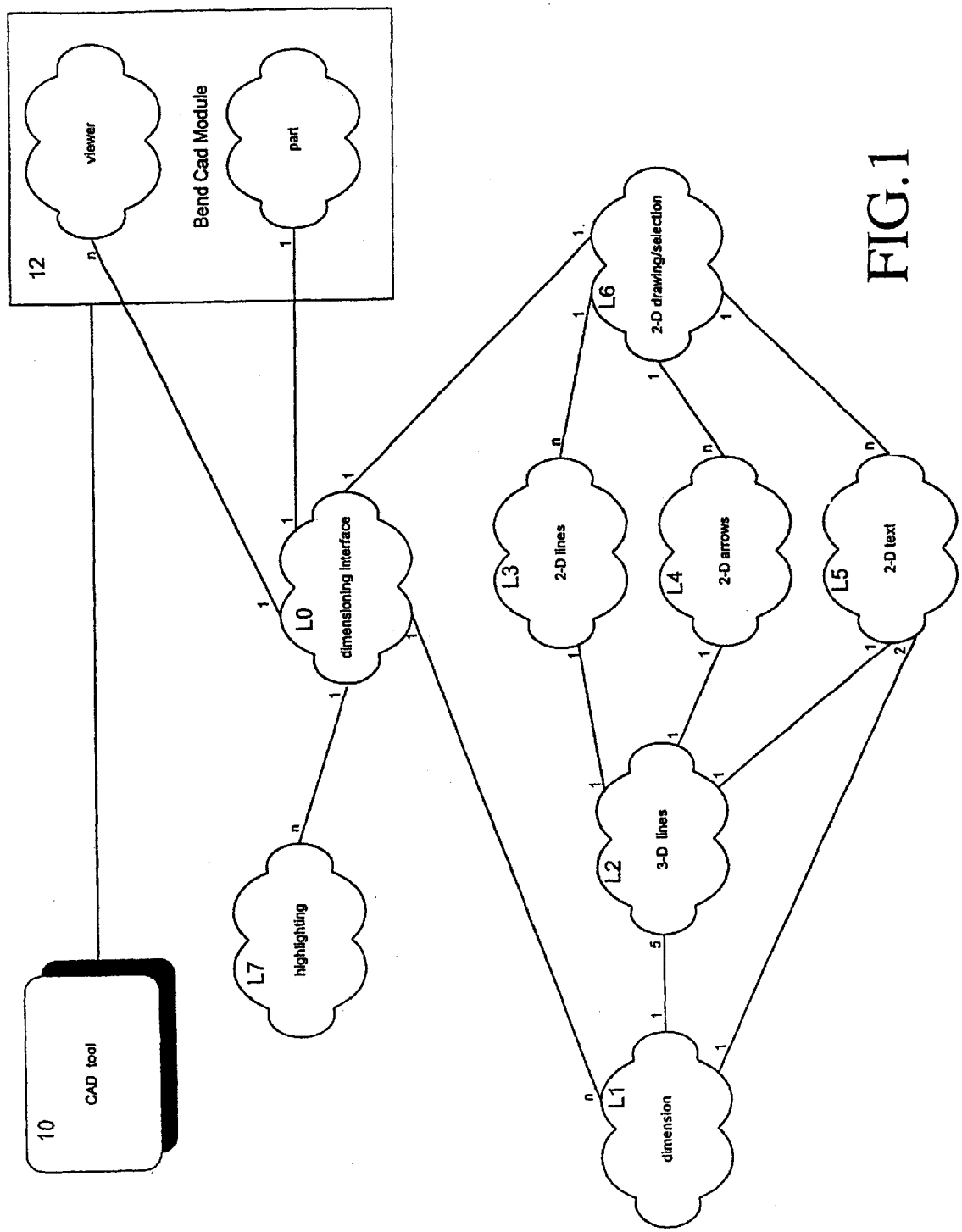
FIG. 1 illustrates an exemplary class diagram of a dimensioning system, in accordance with an aspect the present invention.

In FIG. 1, an AP100 or other CAD tool 10 may be used to create a (2-D) model of a sheet metal part. The 2-D model typically includes formings (e.g. holes), bend lines and the size and shape of the model. The AP1OO is a 2-D CAD system commercially available from Amada Metrecs Company, Ltd. of Japan. Of course, any other CAD tool 10 capable of defining a part's size and shape may be used. The part data is sent to a BendCAD module 12, preferably via dynamic data exchange (DDE) messages. For example, the various features and aspects disclosed in the commonly assigned U. S. patent application Ser. No. 09/031,660 entitled "Apparatus and Method for Transferring, and Editing Sheet Metal Part Data", in the names of Kalev KASK et al., may be implemented to exchange part data. That patent application is hereby expressly incorporated by reference in its entirety.

The BendCAD module 12 may comprise an object oriented bend model system, such as BendCAD which is commercially available from Amada Company. Further, the various features disclosed in U.S. patent application Ser. Nos. 08/700,671, 08/690,671, 08/688,860 and 60/016,958, which are hereby expressly incorporated by reference in their entireties, may be provided in the BendCAD module 12. Generally, the BendCAD module may be used for viewing a 2-D or (3-D) model of the part. The BendCAD module 12 allows bending a 2-D model along bend lines, to create a 3-D model of the part. In addition, various viewing functions such as rotating, panning, zooming, etc. may be provided to permit a user to view the part in a preferred position.

The BendCAD module 12 contains a viewer class and a part class which communicate mouse events to an object of a dimensioning interface class L0. A one to one relationship exists between the part class and the dimensioning interface class L0. A many to one relationship exists between the viewer class and the dimensioning interface class L0. The part class stores information about the part geometry, e.g., how many faces a part has, geometry of the faces, bend line information, etc. The view class stores all information relating to the viewing window and decides how to display the part after rotating, zooming, etc. The view class also stores the graphical user interface (GUI) information.

Exemplary mouse events are clicking and holding a mouse button (mouse button down), releasing the mouse button (mouse button up), and moving the mouse (mouse move). For the purpose of this document, all mouse button down and mouse button up events refer to the left button of a mouse unless stated otherwise. However, although the left button is described for a preferred embodiment, the right button or center button, or some combination of keyboard events, or voice recognition may be used instead.

In addition to receiving mouse events, the dimensioning interface object L0 may interpret keyboard and mouse events to decide which dimensions or entities displayed on the screen are intended to be selected, how the dimension is to be defined, and where the dimension is intended to be repositioned. Based on the results of the dimension interface object's decision, messages are generated and dispatched to the proper objects. To enable dispatching of messages, the dimensioning interface class L0 contains pointers to a 2-D drawing/selection class L6, a highlighting class L7, and a dimension class L1, each of which is described below. The dimensioning interface class L0 has a one to many relationship with the highlighting class L7 and with the dimension class L1. The dimensioning interface class L0 has a one to one relationship with the 2-D drawing/selection class L6. Another function of objects of the dimensioning interface class L0 is to send drawing commands back to the BendCAD module 12 for drawing user selected dimensions.

From the user's point of view, the features of the present invention are simple. The user selects one or two part entities and as a response, the system calculates the dimension between the selected entities and displays the dimension information in a default display orientation. Part entities may include loop centers, circles, arcs, bend lines, bend line end points, lines (edges of a part), line end points, and faces. Before displaying the dimension information, the user selects whether the dimension will represent an angle or distance relationship between the two selected entities. If a distance relationship was selected, the user may then define which distance between the selected entities will be measured. If only one entity is selected and the entity is a circle or arc, the user may also choose to measure a radius or diameter of the selected entity. After the dimension is displayed, the user may select and drag the displayed dimension to a preferred position.

Thus, the process of creating a dimension essentially involves three steps. First, an invariant reference to two entities which the dimension is attached to is established (one entity in the case of diameter/radius dimensions). Second, the reference is resolved. In other words, the referenced entity is found. Third, the 3-D distance or angle is calculated by simple 3-D geometry using the coordinates of both selected entities.

If the part geometry changes, due to bending at a different bend angle for example, the dimension is recreated or updated based on the changes. Thus, upon a part change, an entity's position, i.e., coordinates, may also change. Consequently, a new value needs to be recomputed for the new coordinates. The new value is recomputed by the same method of calculation used for the initial dimension calculation.

However, according to a preferred embodiment, if a dimension is defined on more than one face, the system decides whether to display the dimension according to the following rule: if the dimension was defined on a flat part, then the dimension will only be displayed on the flat part; if the dimension was defined on a folded part, then the dimension will only be displayed on the folded part. For example, when the bend angle changes so the part becomes flat, i.e., both faces become coplanar, all distance dimensions between the two faces disappear. If the dimension is defined on only one face (including adjacent bend lines), the dimension will always be displayed, even when the part changes from flat to folded and vice versa. When the dimension is defined on only one face (including adjacent bend lines), the coordinate system of the dimension is local to that face to simplify calculations.

According to a preferred embodiment of the present invention, in order to facilitate selection of a desired entity or a dimension, the user need not position the mouse cursor exactly upon the entity or dimension desired for selecting. Moreover, entities which are blocked from view may be selected. To enable these features, a preference hierarchy (picking order) may be employed. Thus, when selecting targets (including entities and dimensions) on a display screen, upon a move button up event, a prioritization scheme is employed to determine what the user is selecting. In addition, to eliminate guesswork involved in selecting the desired target, as the user moves the mouse cursor around the screen, a marker, i.e., a text description of the target, is displayed on the screen, (see for example FIG. 7) indicating what would be selected upon a mouse click and release. Although the preferred embodiment displays text to indicate the target, audio signals such as voice may alternatively be employed to indicate the target.

Figure 7:
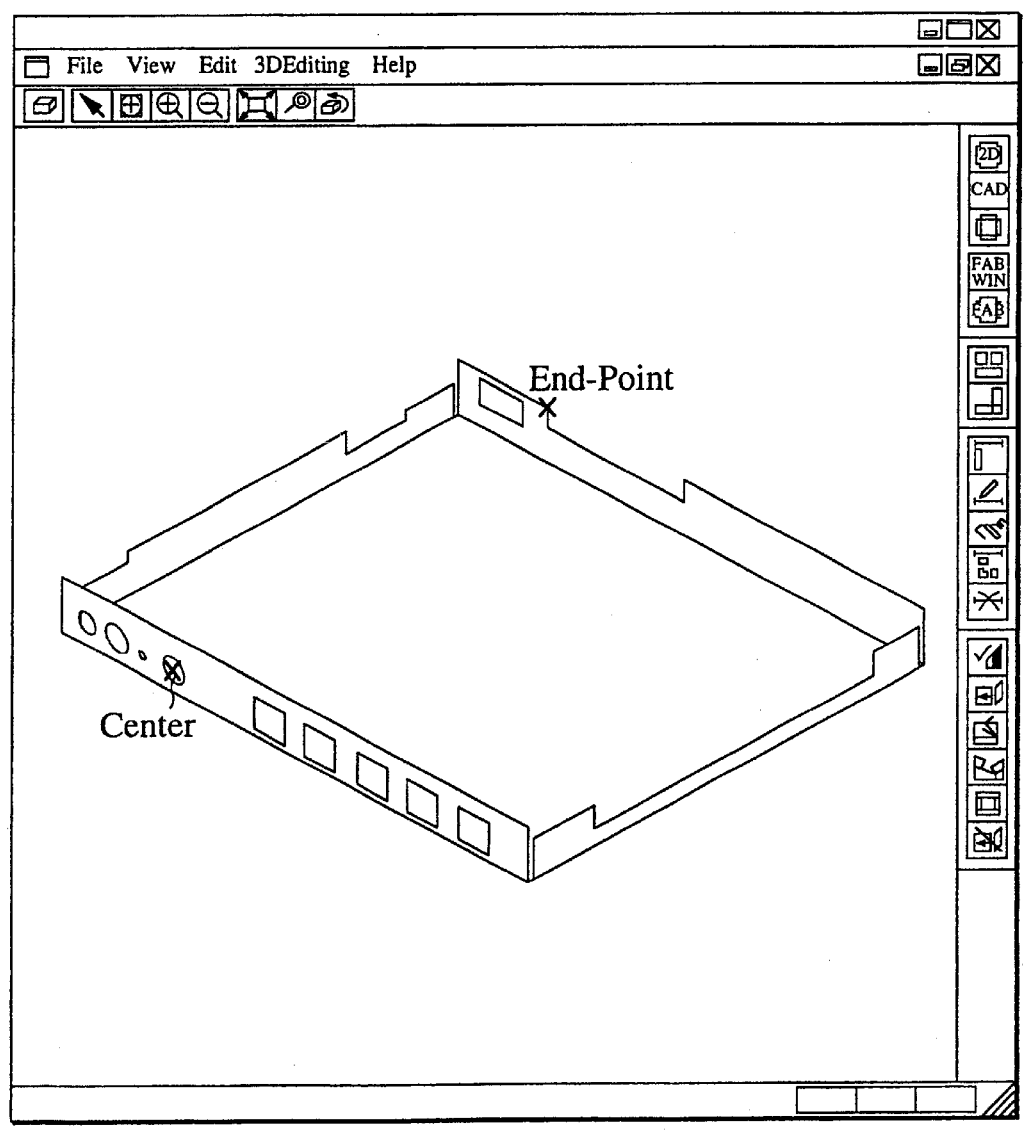
FIG. 7 illustrates a part and two candidate entities along with text markers indicating the type of each candidate entity, in accordance with an aspect of the present invention.

An exemplary preference system including a picking order is now described. Using the known mouse cursor coordinates, all objects within a predetermined distance of the mouse are determined. Then, in accordance with the picking order, a marker is displayed for a candidate entity. In a preferred embodiment, the picking order is in the following order: small loop center; circle; arc; bend end point; line end point; bend line; line; large loop center; dimension; and face. Thus, if a face, dimension and end point are all within a predetermined distance from the mouse cursor, the candidate entity will be the end point. Consequently, an end point marker will be displayed on the screen, indicating the end point as the candidate for selection, as shown in FIG. 7. For loops, faces and circles, the center of the entity is selected. The small loop is a loop with a radius smaller than a predetermined amount. The large loop is a loop with a radius larger than a predetermined amount.

The picking order is run through on every mouse move event. Thus, the user can always easily select desired entities and dimensions. However, in certain orientations, it may be difficult for a particular entity to be selected, e.g., a face because it is at the bottom of the picking order. In this case, a filter may be employed. The filter can prevent certain entities or a dimension from becoming a target. For example, if it is difficult to select a face because for all positions of the mouse cursor, a circle is always within the predetermined distance of the mouse cursor and is therefore always the target, the circle may be filtered out from being a target entity. The user selects which entities are filtered, for example by a drop down menu. As a result of the circle being filtered, when running through the picking order, the circle is ignored, and thus the face or another entity can become the target. Such a filter mechanism may be implemented through a simple boolean flag in the function running through the picking order in response to mouse move events.

Figure 2:
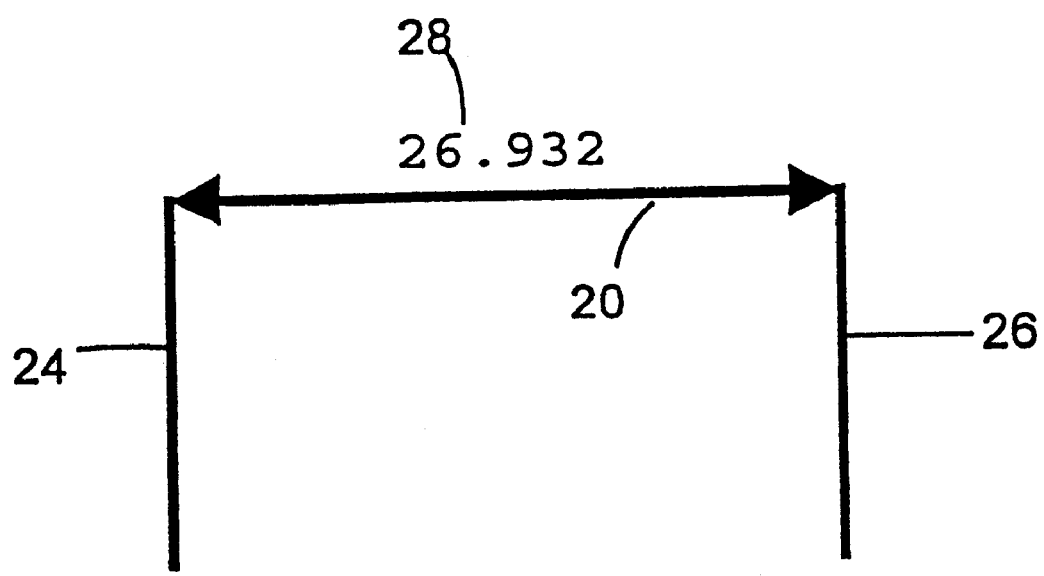
FIG. 2 illustrates components of a dimension, in accordance with an aspect of the present invention.

Referring now to FIG. 2, the concept of a dimension is explained. The dimension information displayed to the user generally consists of an arrow line 20, extension lines 24, 26 and a value 28. The arrow line 20 shows a space between two selected entities which is being measured. The dimension amount for the indicated distance is represented by the value 28. The extension lines 24, 26 connect the selected entity with the arrow line 20 to show what space is being measured.

After the user selects an entity, an entity attachment point must be selected as the point on the entity being measured to or from. A description of selecting attachment points for entities other than points is provided below. Of course, if the selected entity is a point, the selected entity is the attachment point as well.

Another component of the dimension is the extension line 24, 26, although in some cases, extension lines might not be present. Calculating extension lines 24, 26 for angle and distance dimensions requires different processes. Calculating extension lines 24, 26 for distance dimensions will be explained first.

Figure 4:
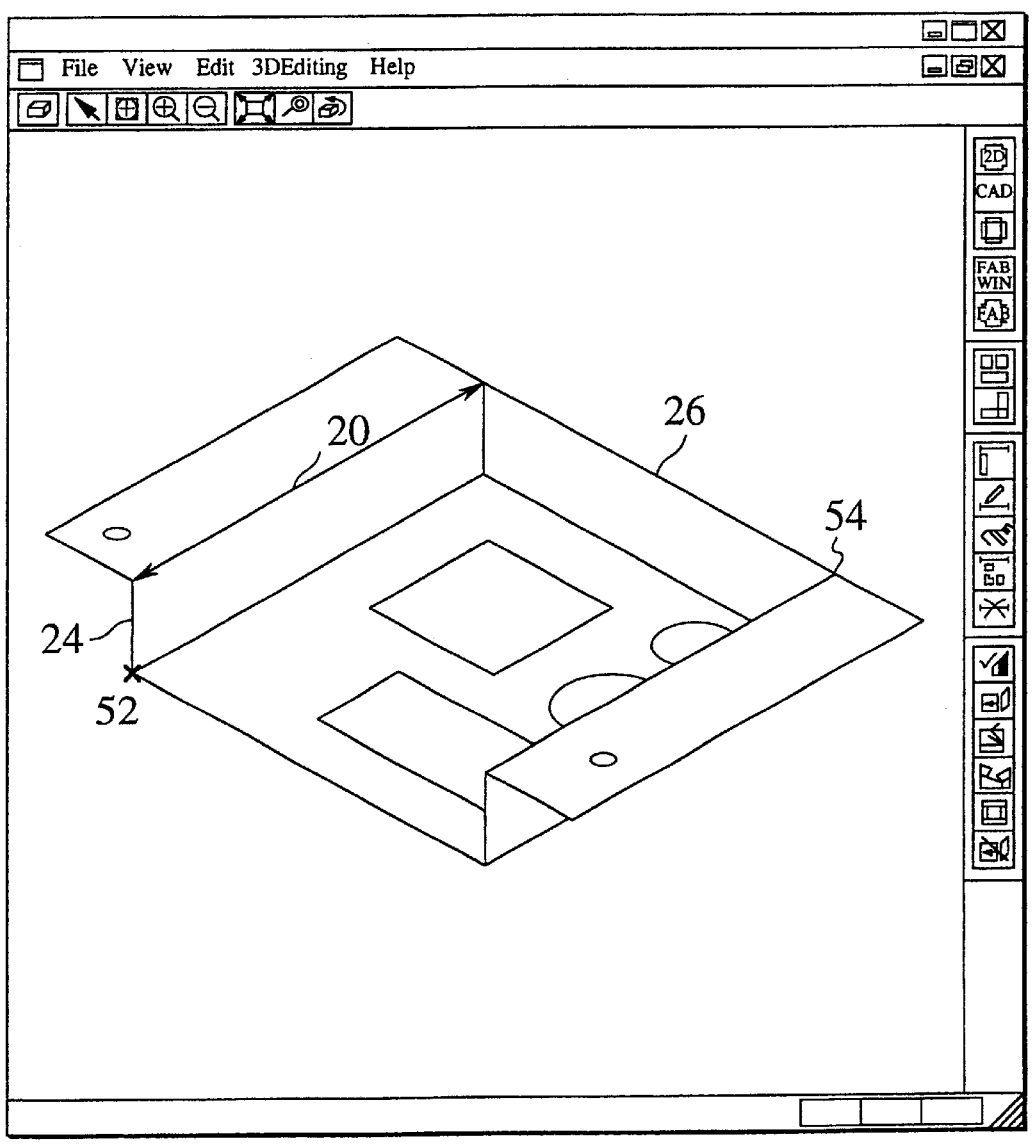
FIG. 4 illustrates a part and an associated defined distance dimension, in accordance with an aspect of the present invention.
Figure 5:
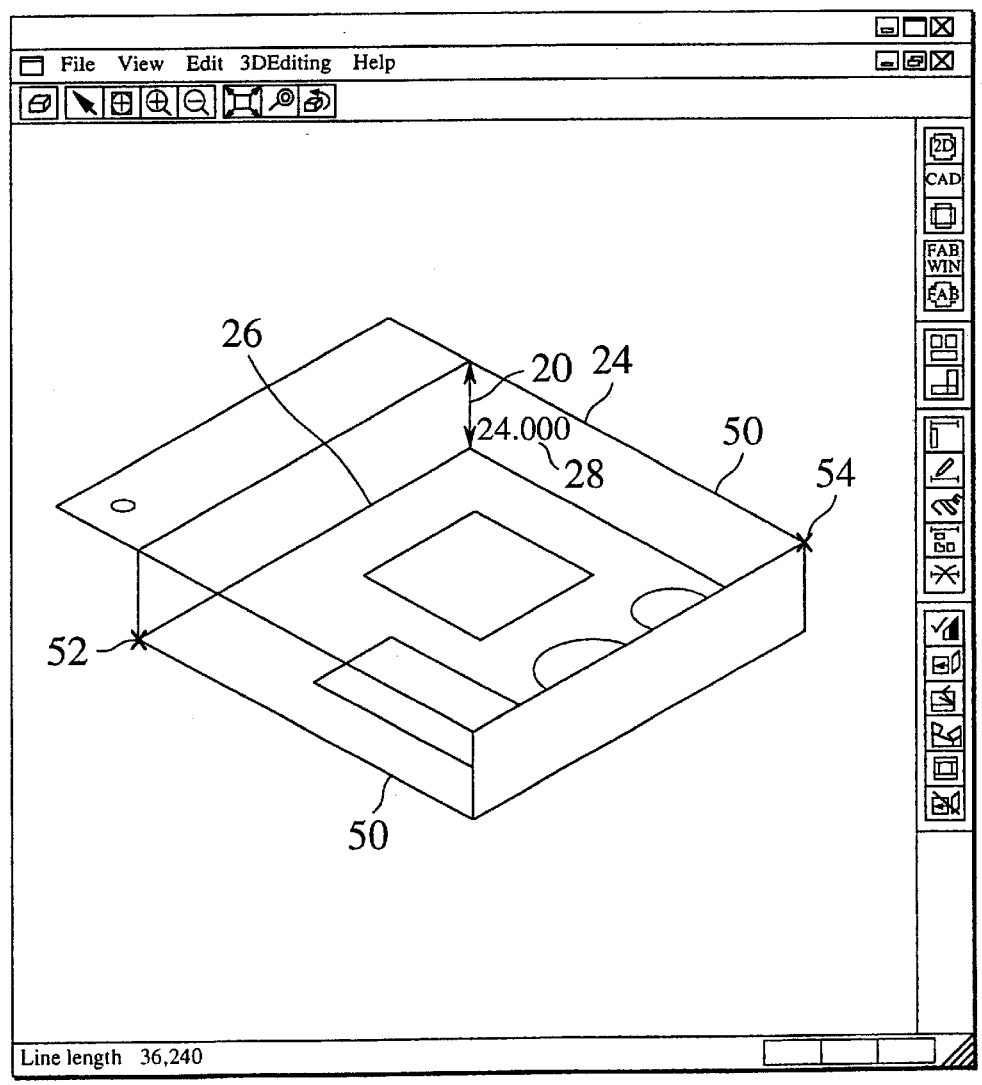
FIG. 5 illustrates the part shown in FIG. 4 along with a different defined distance dimension, and a cuboid constructed between two attachment points, in accordance with an aspect of the present invention.
Figure 6:
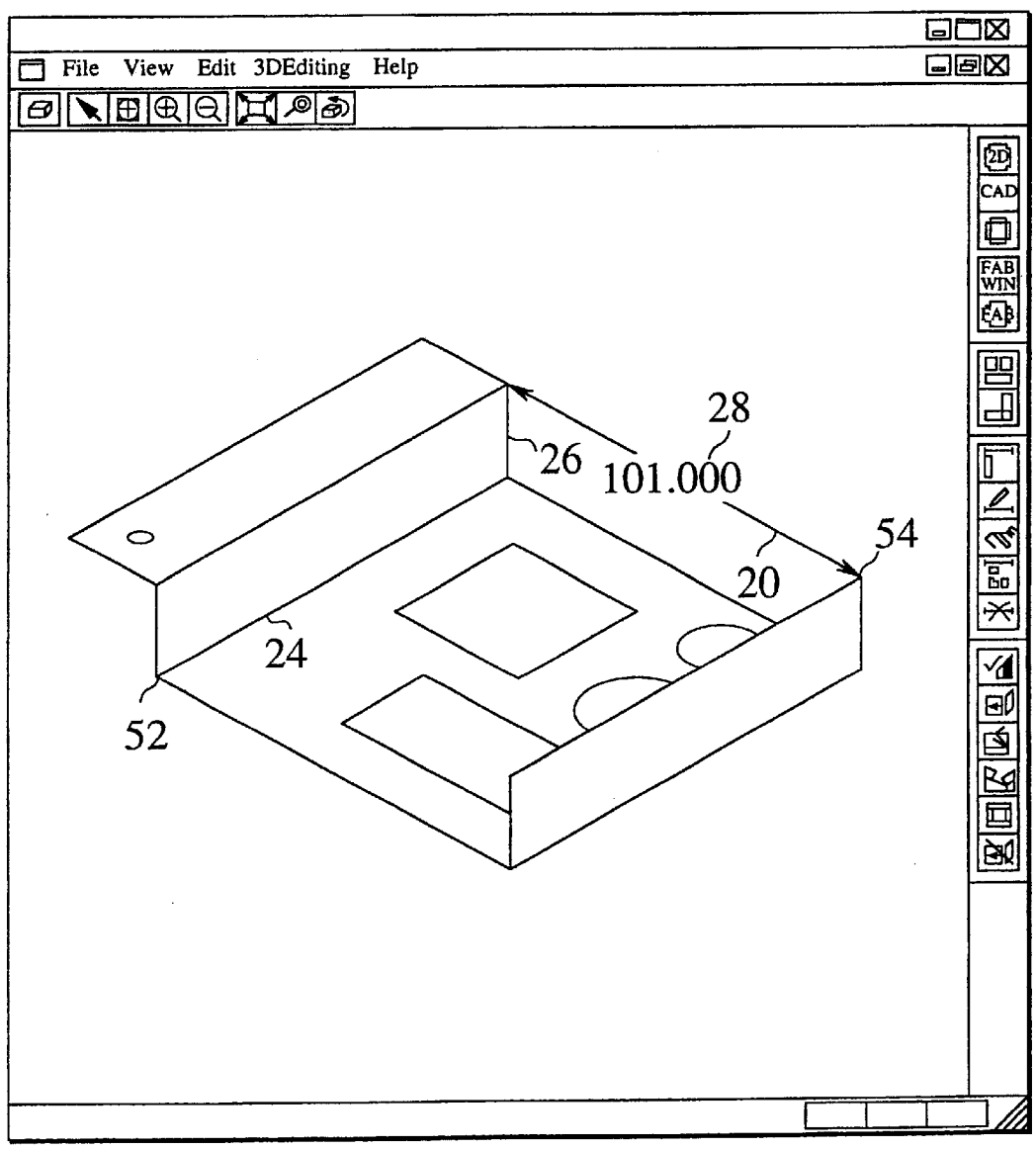
FIG. 6 illustrates the part shown in FIG. 4 along with a different defined distance dimension, in accordance with an aspect of the present invention.

Extension lines are not displayed on the screen when the distance dimension being measured is a direct straight line distance between the two attachment points. For a distance dimension, the extension lines 24, 26 are initially constructed based upon the user's selection of a measurement method, i.e., which distance between 2 points is being measured. According to a preferred embodiment of the present invention, between any two selected attachment points, four different distances may be measured. The first distance is the straight line distance between the two selected points. FIGS. 4, 5, and 6 illustrate three other distances which can be measured between the same two attachment points.

In FIGS. 4, 5, and 6 each arrow line 20 shows the space being measured relative to the part. Thus, the arrow line 20 in FIG. 4 represents the length distance between the attachment points, the arrow line 20 in FIG. 5 represents the height difference between the attachment points, and the arrow line 20 in FIG. 6 represents the width difference between the attachment points. A preferred default position of the arrow line 20, may be for example, the edge of a defined cuboid 50 closest to the mouse cursor. The cuboid 50 is defined by the attachment points and is illustrated in FIG. 5. Note however, preferably all edges of the cuboid 50 are never simultaneously displayed on the screen, nor are the attachment points. Only the three edges along a selected path are displayed. The complete cuboid 50 and the attachment points 52, 54 shown in FIG. 5 are for explanatory purposes only. Repositioning of the distance dimension may cause additional extension lines 24, 26 to appear and will cause recalculation of the extension lines 24, 26.

Figure 8:
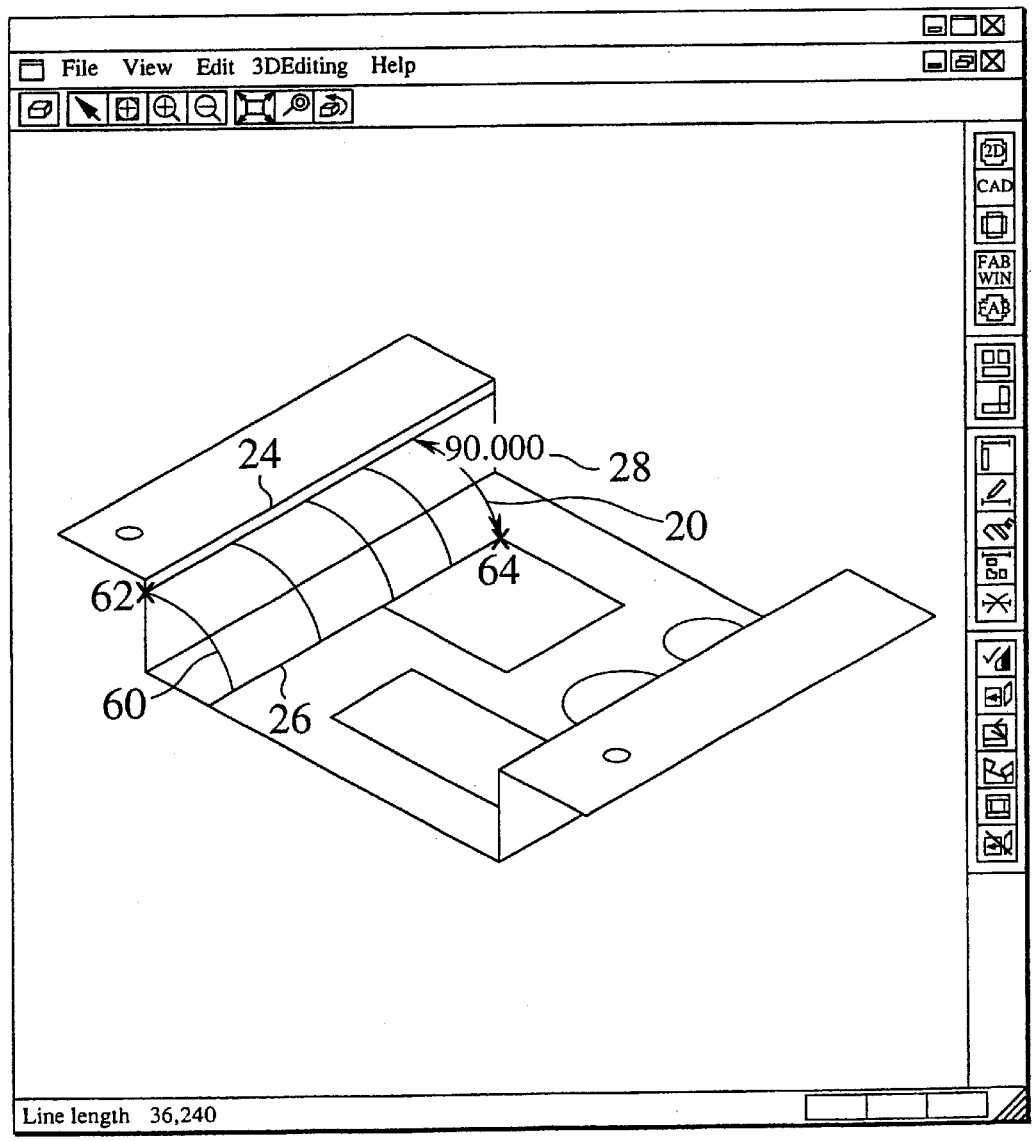
FIG. 8 illustrates a part and a defined angle dimension along with a cylinder used for constructing angle dimensions, in accordance with an aspect of the present invention.

For an angle dimension, the extension lines 24, 26 may connect the attachment points to the arrow line 20 (actually an arc for angle dimensions) as shown in FIG. 8. If the two selected entities are in the same plane, no extension lines are displayed and the arrow line (arc) 20 directly connects the two attachment points. If the entities are not in the same plane, the arrow line (arc) 20 extends from the second selected attachment point and one extension line is displayed between the first attachment point and the proximate end of the arrow line (arc) 20. Repositioning of the dimension may cause additional extension lines 24, 26 to appear and requires recalculation of the extension lines 24, 26.

Figure 9A:
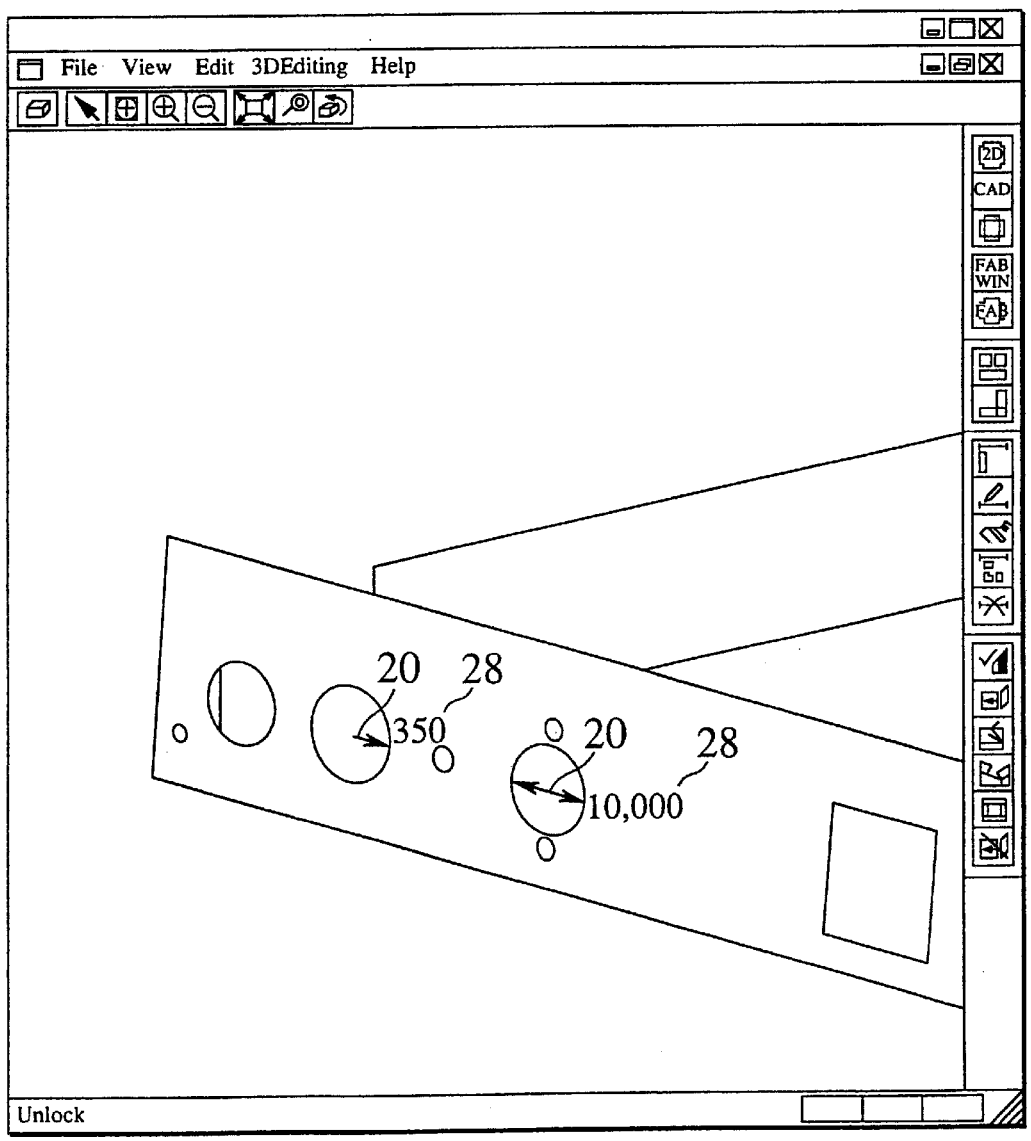
FIG. 9a illustrates a part, a defined radius dimension displayed in a default position, and a defined diameter dimension displayed in a default position, in accordance with an aspect of the present invention.
Figure 9B:
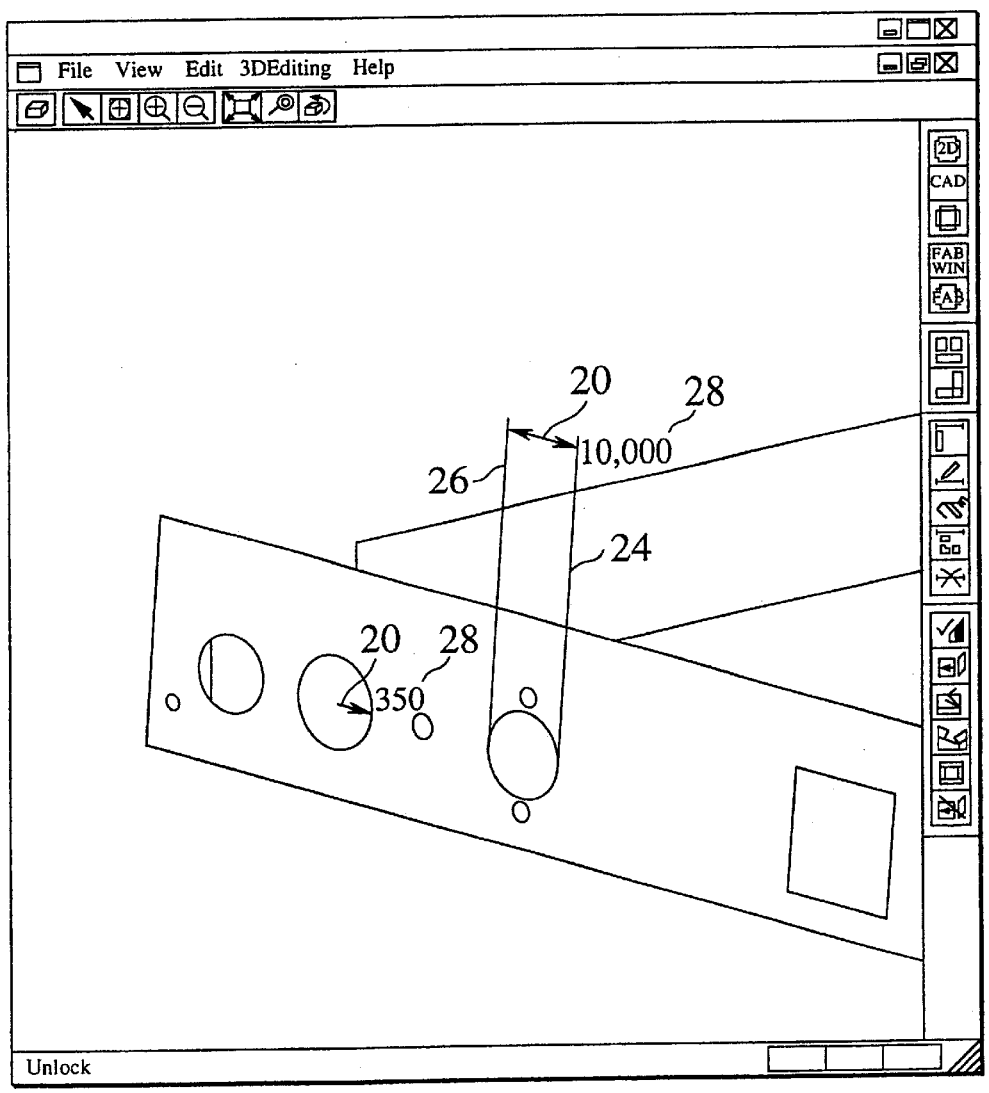
FIG. 9b illustrates a part, a defined radius dimension displayed in a default position, and a defined diameter dimension displayed in a repositioned position, in accordance with an aspect of the present invention.

For radius/diameter dimensions, such as those shown in FIG. 9a, initially no extension lines 24, 26 are drawn. However, if the dimension is repositioned, extension lines 24, 26 extend between the center of the entity (for radius dimensions) and the perimeter of the entity, to the respective proximate ends of the arrow line 20. For repositioning of diameter dimensions, the extension lines extend from opposite points on the perimeter of the entity to the respective proximate ends of the arrow line 20, as seen in FIG. 9b. For all types of dimensions (angle, distance, radius/diameter), the extension lines 24, 26 extend normal to the selected entity from which they originate.

The value 28 represents the numerical distance in 3-D space between the two selected entities, or the angle between the two selected entities, or the radius or diameter of the single selected entity. Because the coordinates of each selected entity and also its attachment point are known, the value of the distance can be calculated in part units by known geometric methods. In a preferred embodiment, the coordinates of all components of the dimension are also relative to the part model's origin.

Thus, once the user selects two entities (one entity for radius/diameter dimensions), based upon the user's input, the system computes a unique initial dimension setup. Namely, the system computes the value 28, the arrow line 20, and any necessary extension lines 24, 26. In a preferred embodiment, once the dimension has been defined, it can be repositioned by placing the mouse cursor on any part of the dimension, including the arrow line 20, the extension lines 24, 26 or one of the selected entities, and dragging the dimension to a preferred position.

For any given part model, several types of dimension may be defined. Exemplary types of dimensions show the distance between: two points; a point and a line; a point and an arc; a point and a plane; two lines; a line and an arc; a line and a plane; and two planes. Angle dimensions may be defined between two non-parallel lines, two non-parallel planes, and a line which is not parallel to a plane. Radius and diameter dimensions may be defined for circles and arcs.

When constructing dimensions between an arc and a point, the selected point must be on the plane of the arc. The arc attachment point will be either the arc center, or the arc point closest to or farthest from the selected point. The user may select the attachment point. The default position of the arc attachment point, according to a preferred embodiment, is the arc point closest to the selected point, if the arc point is not an arc end point. Otherwise, if the arc point farthest from the selected point is not an arc end point, then the farthest arc point is the arc attachment point. Otherwise, the arc center is the arc attachment point.

The line to arc dimension measures the distance between a point on a line (the user must select whether the point on the line is the closest point to the arc or the farthest point on the line from the arc) and an arc according to the following specifications. The line and arc must be on the same plane. If the arc and line do not intersect and the arc point closest to the line is not an arc end point, then the closest arc point to the line is the arc attachment point. Otherwise, if the arc point farthest from the line is not an arc end point then the farthest arc point is the arc attachment point. Otherwise, the arc center is the arc attachment point. Thus, when selecting a line to arc dimension, a point to arc dimension is calculated using the point on the user selected point on the line. When the dimension is repositioned, the line attachment point shifts. If repositioning moves the dimension beyond the line, the line is extended with an extension line and the line attachment point is within the new extension line.

For point to line dimensions, the line attachment point is the point on the line closest to the selected point. For line to line distance dimensions, an arbitrary end point is selected from the first line. The line attachment point of the second line is the point on the second line closest to the arbitrary end point. For faces, the center point of the face is the attachment point. For line to face distance dimensions, the line attachment point is the point on the line closest to the face center point. When the dimension is repositioned, the line attachment point shifts keeping the arrow line 20 perpendicular to the line. If repositioning moves the dimension beyond the line, the line is extended with an extension line and the line attachment point is at the end of the new extension line.

Referring back to FIG. 1, when the user selects two entities, an object of the dimension class L1 initially constructs an empty dimension and initializes it. In addition, after selecting each entity, it is added to a highlighting list in a highlighting object of a highlighting class L7. After the dimension is constructed, the entities are cleared from the highlighting list. Next, the dimension object gets CAD information (e.g., coordinates, ID's) and measuring information (i.e., angle or distance; edges in cuboid/cylinder to use) and converts the information into 3-D lines, i.e., a 3-D dimension including an arrow line 20 and any necessary extension lines 24, 26. By using the CAD information specific to the displayed part, this new 3-D dimension becomes associated with the displayed part, in particular the selected entities of the part.

In order to implement the present invention, a dimension class L1 must be created. Accordingly, every defined dimension, whether drawn on the screen or not, corresponds to a unique dimension object containing all the information regarding its association to the part model and its drawing. The dimension object is associated with the part model by pointers to the two selected entities. Using inheritance, each different type of dimension (point to point, point to line, etc.) can have its own class to model behavior specific to the dimension type. Thus, the dimension class L1 is actually a base class, although the subclasses are not shown in FIG. 1.

Objects of the dimension class L1 have member functions for constructing 3-D lines. In other words, the member function calculates the coordinates of each 3-D line and stores the information for each 3-D line in its own object which is instantiated from a 3-D lines class L2. When calculating the coordinates of 3-D lines, the part origin is used resulting in the 3-D dimension being relative to the part. Up to five 3-D line objects can be instantiated for each dimension object, one object for each extension line 24, 26, and one object for the arrow line 20.

Each 3-D lines object has a member function for determining whether the 3-D line is visible, based upon the part's orientation relative to a view plane. The 3-D lines object checks visibility whenever the part is rotated. Determining the visibility comprises determining if each attachment point and arrow head is visible, performing view port clipping, and determining whether the line is behind another entity of the part. View port clipping determines which portion of the 2-D lines are visible in the view port and is necessary for centering the text and deciding whether or not to display the dimension. In a preferred embodiment, if no arrows are visible, the dimension cannot be displayed. However, the dimension may be displayed according to other conditions such as one attachment point has to be visible, or a portion of a dimension component has to be visible.

In addition to checking visibility, the 3-D lines object constructs 2-D objects to enable display of the 3-D dimension in a 2-D plane, such as a display screen. Therefore, the 3-D lines object converts each 3-D line to a 2-D line and instantiates one 2-D line object for each 2-D line calculated. When the new object is instantiated, it is placed in a list stored in an object of the 2-D drawing/selection class L6. Because every time the part is rotated the 3-D lines object determines visibility, the data in the 2-D lines object changes after rotating the part.

The 3-D line object also determines placement of a text box containing the value 28 and instantiates a single corresponding 2-D text object. Ideally, the text box should be displayed centered relative to the arrow line 20. Consequently, whenever the part is zoomed, panned, or rotated, the position of the text box on the screen needs to change to maintain the centered position. Thus, an object of a 2-D text class L5 must be instantiated by the 3-D lines object to record the 2-D position of the text box. When the new 2-D text object is instantiated, it is placed in a list stored in an object of the 2-D drawing/selection class L6. Because every time the part is rotated the 3-D lines object determines visibility, the 2-D text object data changes whenever the part is rotated.

Finally, the 3-D line object determines when and where to draw the arrows on the arrow line 20 and instantiates a single corresponding 2-D arrows object. Deciding whether to show both, one or no arrow heads depends of the visibility of the arrowhead. If the end of the arrow line 20 is visible, the arrow head is added to the visible end of the arrow line 20 using new small line segments. When the new 2-D arrow object is instantiated, it is placed in a list stored in an object of the 2-D drawing/selection class L6. Because the 3-D lines object makes the visibility determinations every time the part is rotated, the 2-D arrows object changes whenever the part is rotated.

For each 3-D line object, exactly one instance of the 2-D lines class L3, one instance of the 2-D arrows class L4, and one instance of the 2-D text class L5 exists. If the part is panned, rotated or zoomed, the 3-D lines, 2-D lines, 2-D text, and 2-D arrows objects also change. The 2-D lines object L3, the 2-D arrows object L4, and the 2-D text object L5 exist to remember where they are drawn. These objects are also needed for selection, i.e., they allow interpretation of mouse events for selection. Each of the 2-D lines, 2-D text, and 2-D arrows objects is referenced in a list stored in the 2-D drawing/selection object and each of them has a many to one relationship with the 2-D drawing/selection object. Thus, if mouse coordinates are known, each object can be found in the list and compared with the mouse coordinates to determine if an object is near the mouse cursor and therefore intended to be selected. Because all of these objects are in 2-D, each 2-D object coordinates are in the screen coordinate system, not the part coordinate system like the 3-D lines objects. The information stored in the 2-D objects may be sent to the Windows Graphics Device Interface (GDI) to enable drawing on the display screen. Another function of the 2-D objects is to determine their own visibility. However, the 2-D objects determine their visibility due to zooming in and out the view of the part in contrast to rotating the view, which causes the 3-D objects to check visibility.

Objects instantiated from the 2-D drawing/selection class L6 contain data structures for organizing the 2-D lines object, the 2-D text object, and the 2-D arrows object. The data structure, a linked list in a preferred embodiment, enables searching the 2-D lines object L3, the 2-D arrows object L4, and the 2-D text object L5, to find the closest object to a particular point, thus allowing selecting. Consequently, a one to many relationship exists between the 2-D drawing/selection class L6 and the 2-D lines class L3, the 2-D arrows class L4 and the 2-D text class L5. The 2-D drawing/selecting object also contains view port information including the coordinates of the two corners which define the view port, and information about the dimensions, including fonts, colors, and line types. Because the 2-D drawing/selection object keeps track of all the 2-D objects, the 2-D drawing/selection object allows refreshing of the screen. Because the 2-D drawing/selection object stores information about the dimensions including fonts, colors, and line types, the 2-D drawing/selection object allows drawing calls of drawing functions within the 2-D lines object, the 2-D text object, and the 2-D arrows object with the proper colors, font, etc.

The highlighting class L7 defines objects which contain selection information, i.e., the selected entities. The highlighting class L7 is associated with the dimensioning interface class L0 and many highlighting objects can exist for each dimensioning interface object. The highlighting objects function to allow a maximum of two entities to be selected at one time because every dimension includes at most two entities. The highlighting objects indicate on the display screen which entity is selected by highlighting the entity. Because the mouse cursor does not need to be located on an entity for it to be selected (because of the picking order), the highlighting feature is necessary.

Figure 3:
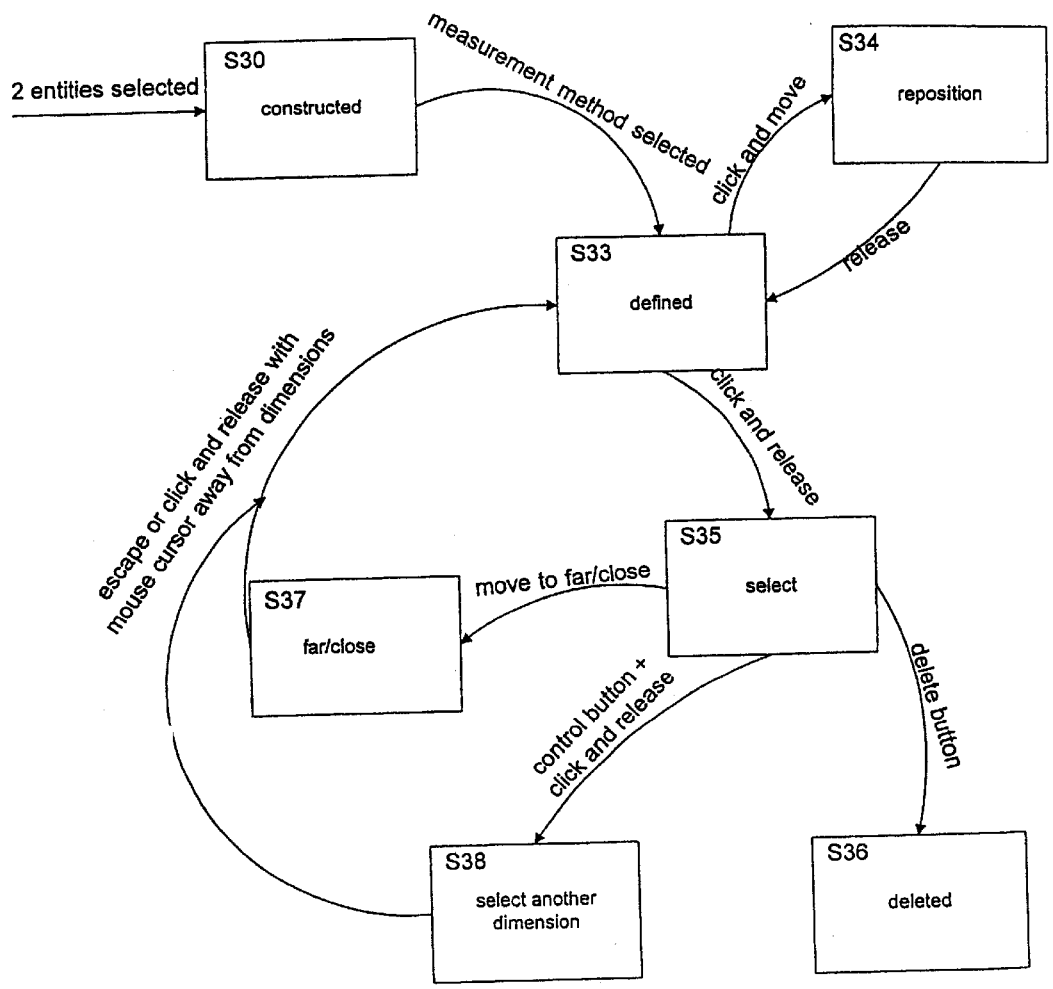
FIG. 3 illustrates a state transition diagram, in accordance with an aspect of the present invention.

Referring to FIG. 3, potential states of an object of the dimension class L1 are shown, in accordance with an aspect of the present invention. Initially, at state S30 the dimension object enters a constructed state when two entities are selected (or one entity for radius/diameter dimensions). After the dimension object is constructed the dimension object can enter a defined state S33 after the user selects the measurement method (edges of the cuboid to display, etc.). When defining the dimension object, the measurement method is defined by mouse events and the dimension information is drawn on the screen, preferably in white. After the dimension object is defined, the dimension object can enter a reposition state S34 by clicking on the dimension information and dragging, i.e., moving the mouse. During repositioning, positioning parameters $Pos_1$ and $Pos_2$ (described below) are modified by mouse move events. The dimension object returns to the defined state S33 from the reposition state S34 by simply releasing the mouse button. When the mouse button is released, the dimension information is drawn on the screen in the new position, and the dimension information t the old position is erased.

From the defined state S33, the dimension object can also enter a select state S35. The dimension object is selected when the mouse cursor is moved to any part of the dimension, and a mouse button down event occurs immediately followed by a mouse button up event. When the dimension object is in the select state S35, a flag in the highlighting object is set and the dimension information is redrawn on the screen in a different color to indicate that the dimension object is selected. In addition, markers on the screen at each end of the arrow line 20 display thickness measurement information (i.e., far, close or neutral). The far/close feature will be described in greater detail below with reference to FIGS. 15, 16, and 17. From the select state S35, the dimension object can enter a far/close state S37, a select another dimension state S38, or a deleted state S36.

The dimension object enters the deleted state S36 when a delete key down event occurs, i.e., pressing the delete key. Deletion of the dimension object involves removing the dimension information from the display screen, releasing the memory and general cleanup (i.e., removing all references to the dimension object). The dimensioning interface object deletes a dimension object by calling the dimension object's destructor. When the dimension object destructs, the 3-D lines objects, 2-D lines objects, 2-D text objects, and 2-D arrows objects, associated with the dimension object are also destroyed.

The dimension object enters the select another dimension state S38 from the select state S35, when the control button is held while the mouse cursor is placed over another dimension and a mouse click and release occurs. When in the select another dimension state S38, a flag is set in the dimension object representing the selected dimension information. Another flag is set in the highlighting object. The flags are used to draw the dimension information in a different color on the screen to show that the dimension information is selected.

The dimension object enters the far/close state S37 when the dimension object is in the defined state S33 and the mouse cursor is placed near the far/close text displayed on the screen. From the far/close state S37 and the select another dimension state S38, the dimension object returns to the defined state S33 by pressing the escape key, or positioning the mouse cursor where no other dimension information is located on the screen, and then clicking and releasing the mouse button.

Dimension construction is performed in two stages, first memory is allocated and then an ID is assigned to associate the dimension with the part. From the user's perspective, constructing a dimension occurs by selecting two entities. The first entity is selected by moving the cursor near an entity of the part represented on the display screen. In a preferred embodiment, the entity which would be selected upon a mouse click and release (candidate entity) is indicated on the screen by a text marker and the entity is drawn on the screen in a different color, e.g., yellow. Once the mouse is clicked and released, the first entity is selected. Subsequently, by repositioning the mouse cursor, selection of the second entity occurs by the same process. After the second entity is selected, the dimension is immediately created to prevent selecting another entity. Thus, the dimension interface class L0 calls the dimension constructor and a dimension class L1 object is instantiated.

Once a dimension is constructed, it must be defined. Defining angle dimensions is described later. Another member function of the dimension interface class L0 enables defining distance dimensions. For a distance dimension, first the attachment points are determined. In one embodiment, the attachment points are the point within the selected entity closest to where the mouse cursor was when the entity was selected. Next a cuboid between the selected attachment points 52, 54 is constructed, as represented by cuboid 50 in FIG. 5. Then, by moving the mouse cursor around the screen, different paths and arrow lines 20 between the attachment points 52, 54, along edges of the cuboid, are displayed for selecting. Once the desired path is displayed, the user clicks and releases the mouse button and the dimension becomes defined S33 with the selected path. The selected path is indicated on the display screen by the arrow line 20 and the extension lines 24, 26, if necessary. FIGS. 4, 5, and 6 show one path along the edges of the cuboid 50 having different edges of the cuboid selected as the arrow line 20.

Constructing a cuboid for distance dimensions is now described with reference to FIG. 5. The two extreme opposite corners of a cuboid 50 which define the cuboid 50 are the selected attachment points 52, 54. Assume for illustration purposes that one of the attachment points 52 has coordinates (0,0,0) and the other attachment point 54 has coordinates (1,1,1). Preferably these coordinates are relative to the part axis. To find the other six corners of the cuboid 50, first the X coordinate is varied by one, then the Y coordinate is varied by one, and finally, the Z coordinate is varied by one. For example, (1,0,0) is the third corner, (1,1,0) is the fourth corner, (0,1,0) is the fifth corner, (0,1,1) is the sixth corner, (1,0,1) is the seventh corner, and (0,0,1) is the eighth corner. With the eight corners, the cuboid 50 can be constructed.

The possible paths a user may select include the line directly between the attachment points 52, 54, i.e., the line (0,0,0)(1,1,1). The other six possible paths are: path2=the line (0,0,0)(1,0,0), the line (1,0,0)(1,1,0) and the line (1,1,0)(1,1,1); path3 =the line (0,0,0)(1,0,0), the line (1,0,0)(1,0,1) and the line (1,0,1)(1,1,1); path4=the line (0,0,0)(0,1,0), the line (0,1,0)(1,1,0) and the line (1,1,0)(1,1,1); path5=the line (0,0,0)(0,1,0), the line (0,1,0)(0,1,1) and the line (0,1,1)(1,1,1); path6=the line (0,0,0)(0,0,1), the line (0,0,1)(1,0,1), and the line (1,0,1)(1,1,1); path7=(0,0,0)(0,0,1), the line (0,0,1)(0,1,1), and the line (0,1,1)(1,1,1).

If the selected path is the line (0,0,0)(1,1,1), the line (0,0,0)(1,1,1) is the arrow line 20. If the selected path is not the line (0,0,0)(1,1,1), two of the selected edges are extension lines 24, 26 and the remaining line is the arrow line 20. The arrow line 20 is the line closest to the position of the mouse cursor at the moment of selecting. The information describing these three 3-D lines is stored within objects of the 3-D lines class L2. After the dimension becomes defined, flags in the dimension interface object and the dimension object change to indicate the dimension has become defined.

In the case of a 2-D part model, a rectangle can be substituted for the cuboid to define the dimension. Accordingly, the dimension can be defined by the two edges of the rectangle (rather than three of the cuboid) connecting the two attachment points.

When measuring an angle dimension, in a preferred embodiment, the user can select an acute angle between the selected entities, an obtuse angle between the selected entities, a complement of the acute angle between the selected, or a complement of the obtuse angles between the selected entities. In a preferred embodiment, the complement is defined as 360°—the angle, but the complement can easily be defined as 180°—the angle.

Constructing an angle dimension is now described with reference to FIG. 8. First, attachment points 62, 64 are selected, based on user selected entities. Then a cylinder 60 between the attachment points 62, 64 is created. In order to create the cylinder 60, the center of the cylinder 60 must be defined, as well as the base, height and radius of the cylinder 60.

However, before defining the cylinder center, a line representing each selected entity needs to be calculated. If the selected entity is a line, then that line represents the selected entity. If a face is selected, a line corresponding to the selected face must be constructed. That line includes the center-point of the face and extends normal from an intersection of the selected entities to the center point. To find the intersection of the selected entities, the entities may have to be extended infinitely. An intersection will always exist because an angle dimension cannot be defined between parallel entities. Thus, the line corresponding to the face may lie outside the face, e.g., if the actual face and line do not intersect, but rather the infinitely extended entities intersect.

Returning to defining the cylinder center, if the two lines representing the selected entities lie on a common plane, the direction vector of the cylinder center is perpendicular to the common plane. The vector originates at the intersection point. If the two lines are not on the same plane and are non-parallel (as seen in FIG. 8) the point on each line closest to the other entity is determined. Each line is considered to be an infinite line when calculating these two points. The line connecting these two points is the cylinder center.

In a preferred embodiment, the default radius of the cylinder 60 is twenty percent of the smallest line representing the selected entity. The height of the cylinder 60 is zero if the two entities lie within the same plane. Otherwise, the default height of the cylinder 60 is the distance between the two entities along the cylinder center line.

For both cases, the base of the cylinder can lie within any plane normal to the center line. In a preferred embodiment, each base of the cylinder includes one of the lines representing the selected entities. If the lines are within the same plane, the cylinder has a zero distance height and only one base is displayed. In a preferred embodiment, the default position of the arrow line 20 is an arc segment, coincident with the base perimeter, including the second selected attachment point 64. In the default position, an extension line 24 extends from the first attachment point 62, normal to the line representing the first selected entity, to the arrow line 20.

When constructing an angle dimension for a 2-D part model, an arc may be used as the arrow line between the two selected entities. Thus, no cylinder is needed.

According to another preferred embodiment, the radius or diameter of a selected entity can be measured. Of course, the selected entity must be a circle or an arc for the radius/diameter measurement to occur. The user can select whether the radius or diameter is displayed via right mouse button clicks. Examples of radius and diameter dimensions are illustrated in FIGS. 9a and 9b. The dimension can be displayed by simply double clicking on the entity. The radius/diameter dimension is calculated by determining the center of the selected entity and drawing a straight line to the perimeter of the circle if a circle was selected, or a point on the arc if an arc was selected. If the arc is over 180 degrees, a diameter as well as a radius dimension can be displayed, otherwise, only a radius can be displayed. For a circle, both the diameter and radius dimension make sense and can therefore be displayed. Although the double clicking feature has been described with reference to displaying diameter/radius dimensions, additional uses of double clicking may be employed, for example if the user double clicks on a line, a dimension showing the length of that line can be displayed.

Repositioning the dimension is now generally described with reference to FIGS. 10–14. When a dimension is in a defined state S33, the dimension interface object, via standard mouse event interpretation, decides whether a reposition state S34 or a select state S35 occurs. Repositioning occurs when a user positions a mouse cursor on the screen close to a dimension already drawn on the screen (i.e., a defined dimension), clicks (without releasing) the mouse button and moves the mouse cursor thereby dragging the dimension with the mouse movement. Repositioning ends when the mouse button is released, returning the dimension to the defined state S33.

Figure 10:
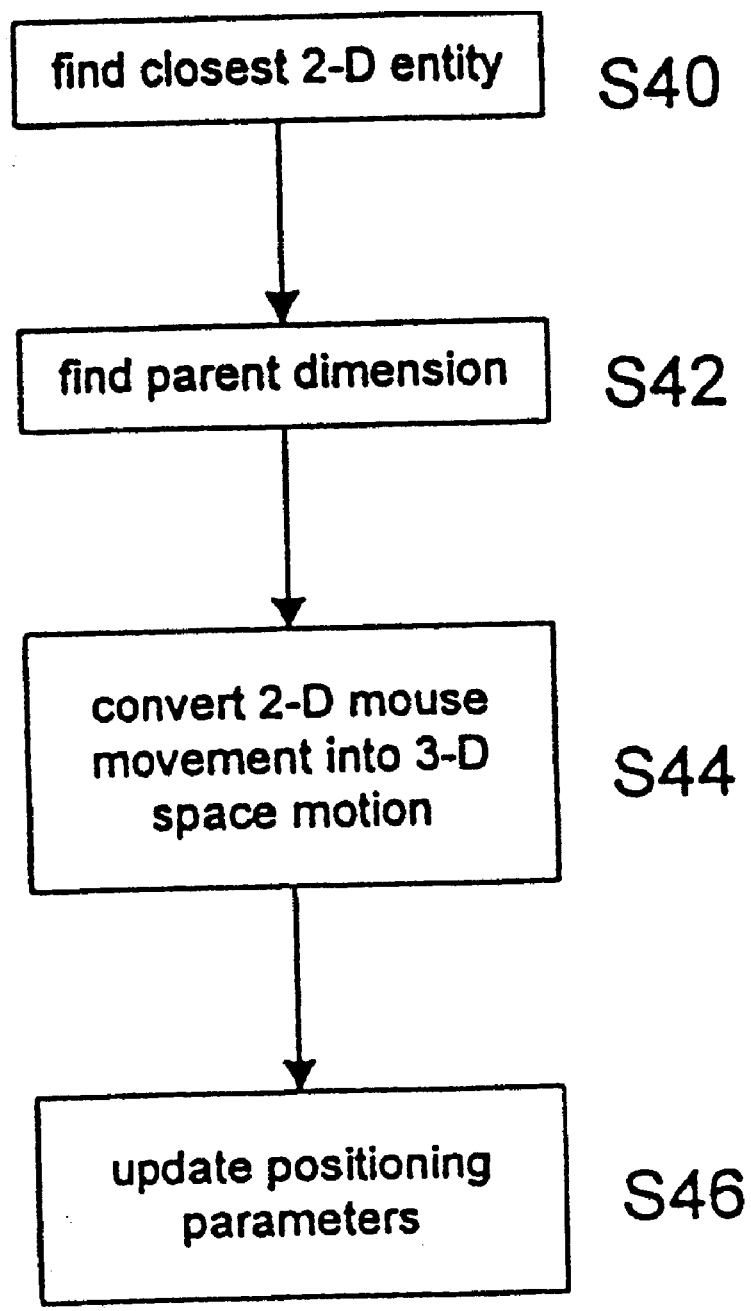
FIG. 10 is a general flow diagram showing logic for user enabled repositioning of a dimension, in accordance with an aspect of the present invention.

Referring to FIG. 10, when repositioning, at step S40 the closest 2-D entity to the mouse cursor position is first found. In other words, it is determined where on the screen the mouse cursor is located and if any component of a dimension, e.g., 2-D line object, has similar coordinates. The comparison between the mouse cursor coordinates and 2-D components of defined dimensions is made via the 2-D drawing/selection object. Once the closest entity is found, a parent dimension of the closest component is determined at step S42. In other words, if an extension line 24 of a dimension is selected, i.e., a 2-D drawing object, the associated dimension object (parent dimension) is found. Once the dimension is selected, the user may drag the dimension to another position by moving the mouse and keeping the mouse button depressed. Thus, at step S44, the 2-D movement of the mouse across the screen is converted into 3-D space motion to determine a position relative to the 3-D part model where the user would like to place the dimension. All of the dimension information is repositioned using dimension repositioning planes which are explained below. At step S46, positioning parameters $Pos_1$ and $Pos_2$ are updated and the dimension may be redrawn, if appropriate, including additional necessary extension lines.

Figure 11:
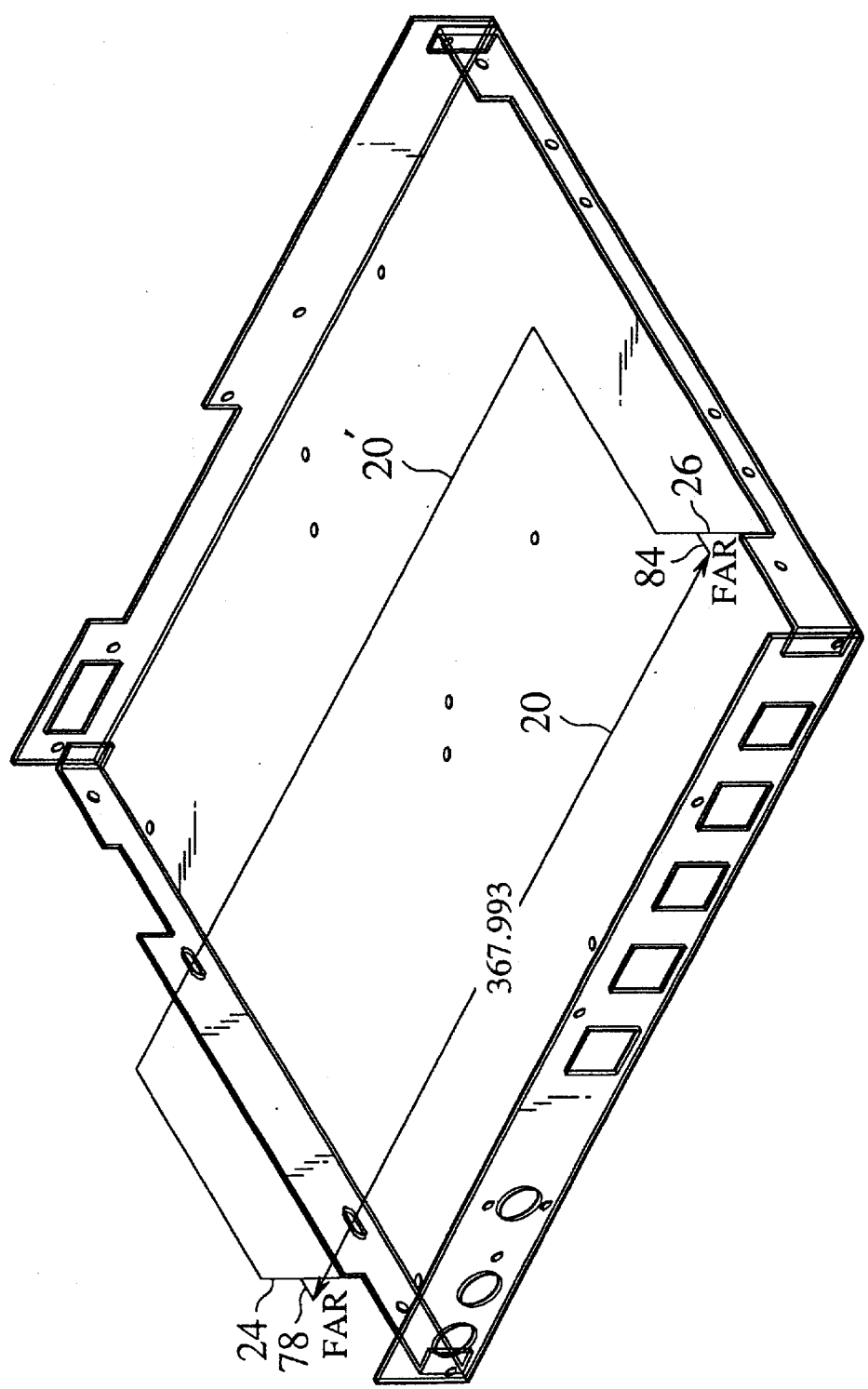
FIG. 11 illustrates a part along with a dimension being repositioned, and text markers indicating a far/close configuration, in accordance with an aspect of the present invention.
Figure 12:
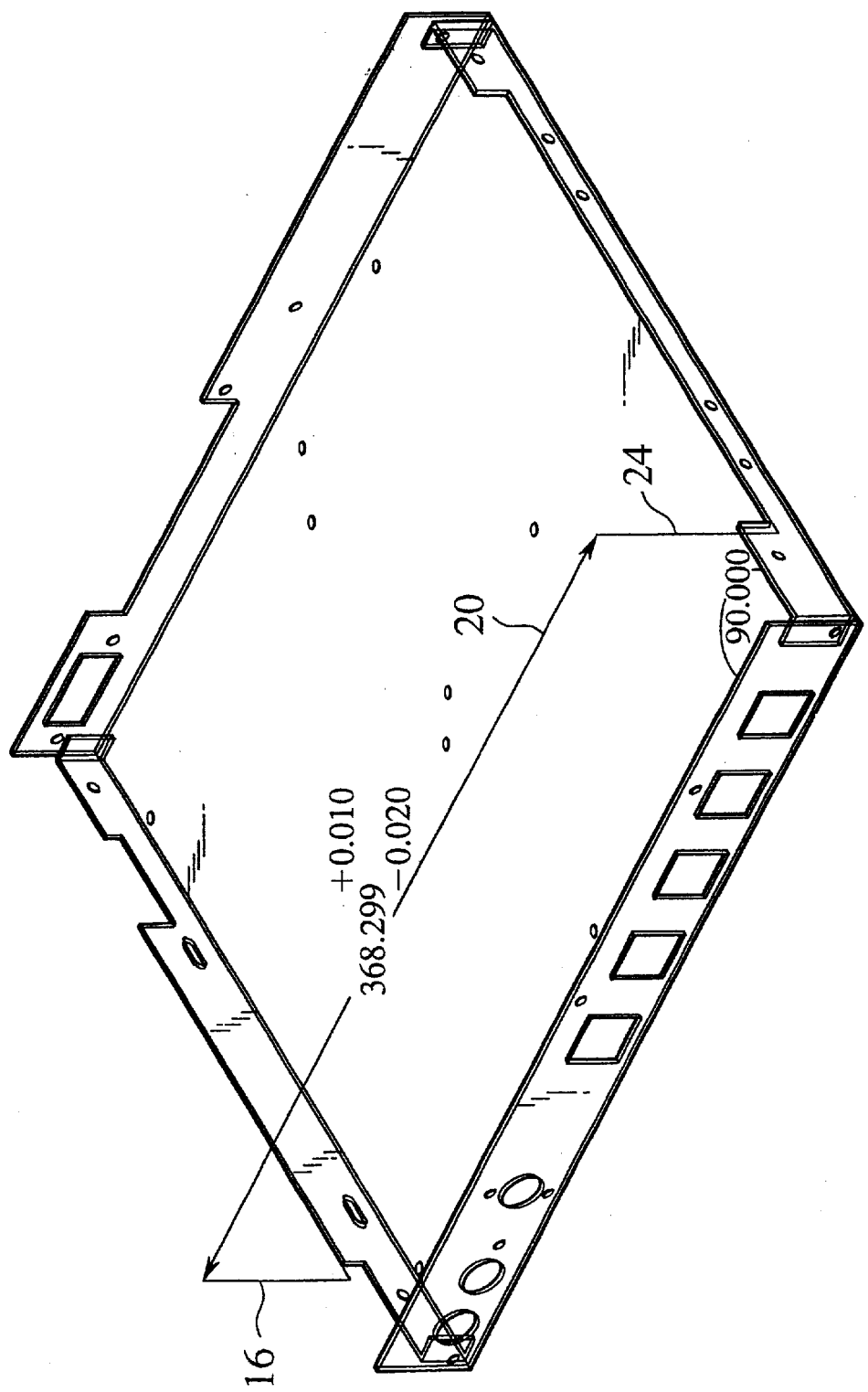
FIG. 12 illustrates the part of FIG. 11 along with a defined distance dimension having displayed tolerance values, in accordance with an aspect of the present invention.
Figure 13:
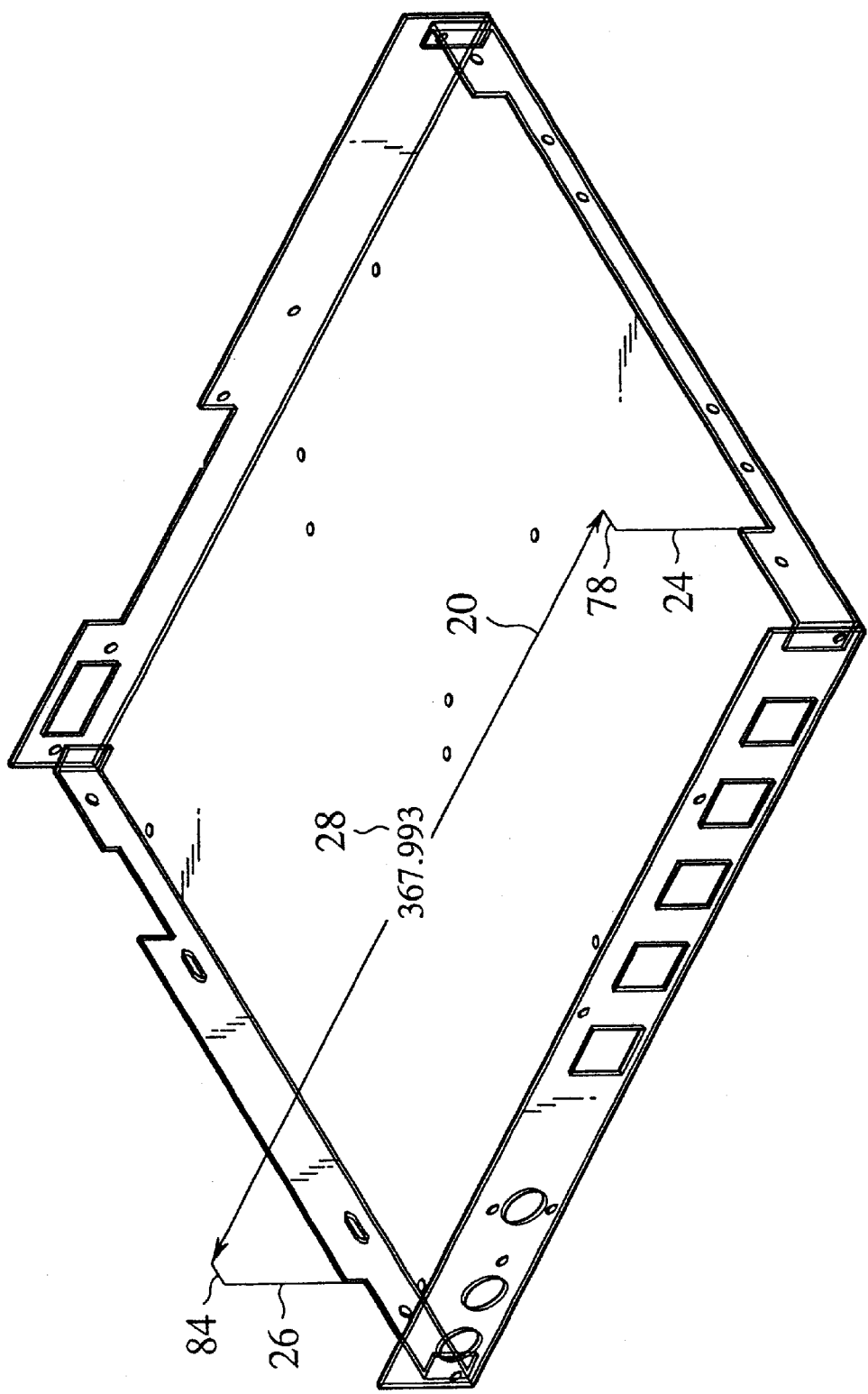
FIG. 13 illustrates the part of FIG. 11 along with the defined distance dimension after repositioning, in accordance with an aspect of the present invention.

FIG. 11 shows a dimension including an arrow line 20 and other dimension information while it is being repositioned including potential arrow line 20'. Note, that until the mouse button is released, signaling the end of repositioning, all of the original dimension information remains displayed on the screen, as shown in FIG. 11. Therefore, the arrow line 20' is only a potential arrow line, because FIG. 11 shows the repositioning before it has been completed. FIG. 12 shows a dimension in one position, and FIG. 13 shows the same dimension after repositioning has finished.

On the mouse button down event, the screen coordinates of the mouse cursor are compared with the 2-D line representing the arrow line, and the point on the 2-D line closest to the mouse cursor's location is determined. Although the mouse coordinates are compared with the arrow line 20 in the described preferred embodiment, any point on any component of the selected dimension may be used. Next, a point on the 3-D line corresponding to the point on the 2-D line is determined by comparing ratios. Finally, the 3-D line point is set equal to a pick point. The ratio comparison is simply determining how far the point on the 2-D line is from the end of the 2-D line and calculating a ratio between that distance and the 2-D line's full length. The pick point is the point on the 3-D line having the same relative distance from the end point on the 3-D line.

Figure 14:
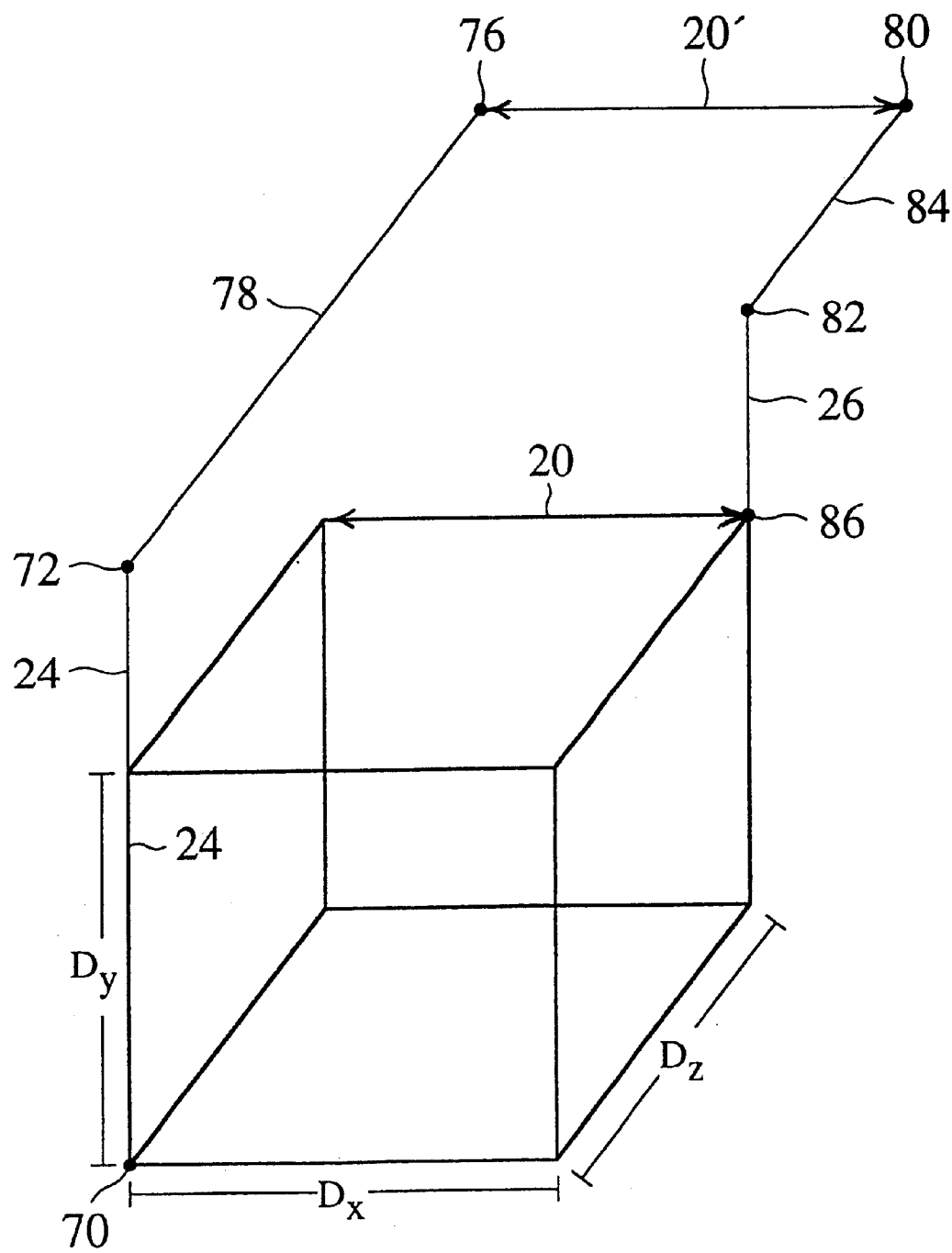
FIG. 14 illustrates a cuboid constructed between two attachment points, and the extension lines which become necessary after repositioning the distance dimension.

Translating mouse move events into positioning parameters $Pos_1$ and $Pos_2$ is now described. $Pos_1$ and $Pos_2$ denote distance components from the first selected attachment point to the proximate end of the arrow line 20. Each positioning parameter denotes a distance component in one axis direction. For example, as shown in FIG. 14, assuming a first selected attachment point 70 and arrow line 20, default $Pos_1$ equals Dy and default $Pos_2$ equals Dz. The Dx, Dy and Dz values each represent the length of the cuboid edge extending in the direction along the corresponding X, Y or Z axis. In other words, Dx is equal to the length of the cuboid edge along the X axis, Dy is equal to the length of the cuboid edge along the Y axis, and Dz is equal to the length of the cuboid edge along the Z axis.

Initially, when a dimension first becomes defined, $Pos_1$ and $Pos_2$ are set equal to default values. The default values are the Dx and/or Dy, and/or Dz values between the first selected attachment point and the proximate end of the arrow line 20. Thus, the default values are dependent on the selected path along the cuboid edges, in particular the position of the arrow line 20. For example, referring to FIG. 5, one of the positioning parameters, e.g., $Pos_2$, has a value of zero because when the distance between the proximate end of the arrow line 20 and the first attachment point 52 is broken into its X, Y and Z dimensional components, two of the distance components are zero. The other distance component i.e., the length of the edge of the cuboid between the first selected attachment point 52, and the proximate end of the arrow line 20, is set equal to the other positioning parameter, $Pos_1$.

On the mouse move event, the mouse cursor screen coordinates are converted to part coordinates. Next, the distance between the pick point and the current mouse coordinates is calculated. This distance is projected onto the repositioning plane. Then, the projected distance is added to the pick point. Finally, the projected distance is broken into its X axis, Y axis, and Z axis components and the component corresponding to the positioning parameter's measurement axis is added to that positioning parameter to get new $Pos_1$ and $Pos_2$ values. On the mouse button up event, the repositioning state S34 is exited and $Pos_1$ and $Pos_2$ are determined from the last mouse move event.

Repositioning is calculated by the dimension object which uses the positioning parameters, $Pos_1$ and $Pos_2$ to compute new 2-D lines. The dimension object receives the mouse movement events and calculates the new dimension position. The new lines are calculated as follows. First the Dx, Dy, and Dz values are computed. Then $Pos_1$ and $Pos_2$ are used to compute the 3-D lines. If $Pos_1$ and $Pos_2$ are both equal to Dx, Dy, or Dz, the lines are calculated using the cuboid as described above.

If $Pos_1$ and $Pos_2$ are not equal to Dx, Dy, and Dz then up to two extra extension lines become necessary. When extra extension lines are necessary, computing the extension lines and the arrow line 20 after repositioning requires calculating six points (five points if $Pos_1$ or $POS_2$ equals Dx, Dy, or Dz).

For example, in FIG. 14 assume $Pos_1=1.5 \times Dy$, and $Pos_2=1.5 \times Dz$, based upon a new arrow line 20', and the first point 70 being the first attachment point 70. The second point 72 is the attachment point plus $Pos_1$. The first extension line 24 will be the line between the first point 70 and the second point 72. The third point 76 is calculated by adding $Pos_2$ to the second point 72. The second extension line 78 extends between the second point 72 and the third point 76. The fourth point 80 is the D value (Dx, Dy or Dz) which is not modified by the position parameters added to the third point 76. In this example, Dx is used because $Pos_1$ is relative to the Y axis and $Pos_2$ is relative to the Z axis. The line between the third point 76 and the fourth point 80 is the repositioned arrow line 20'. The fifth point 82 is calculated as the fourth point 80 plus the D value corresponding to the direction the second extension line 78 extends, minus the positioning parameter corresponding to that direction. In this example, the fifth point 82 is the fourth point 80 plus Dz minus $Pos_2$. The third extension line 84 extends between the fifth point 82 and the fourth point 80. The sixth point 86 is the second attachment point. The fourth extension line 26 extends between the fifth point 82 and the sixth point 86. FIGS. 11 and 13 show repositioned dimensions having four extension lines 24, 26, 78, 84.

If only one extra extension line is necessary, the calculation of the fifth point 82 or the second point 72, as described above, is omitted. Consequently, either the fifth point 82 is set equal to the second attachment point or the first extension line 24 extends between the first and third point.

Repositioning planes are now described. Repositioning of distance dimensions occurs in a repositioning plane. For example, the dimension shown in FIG. 14 was repositioned along the Y axis and Z axis. The plane defined by these axes, the Y-Z plane, is the repositioning plane. According to a preferred embodiment, when the front view of the part is selected, the repositioning plane is the X-Z plane of the part. When the part is viewed from the top view, the repositioning plane is the X-Y plane. When the part is viewed from the side view, repositioning occurs along the Y-Z plane. The user may switch between these views by selecting the view perspective from a pull down menu or depressing buttons on the display screen. Only after a particular view has been selected will the repositioning plane switch to the new corresponding repositioning plane. Thus, when a part is rotated to be viewed from a perspective other than the top, side and front views, repositioning occurs along the repositioning plane corresponding to the last selected view perspective.

Furthermore, if multiple views of the part are simultaneously displayed, each distance dimension is associated with the positioning plane corresponding to the view on which it is visible. When the bend angle changes, the repositioning plane moves with the face if both attachment points are within the same face. If the attachment points are not within the same face, the repositioning plane does not change.

However, if the part is switched from folded to flat or vice versa, the dimension is not displayed.

When repositioning a distance dimension associated with a 2-D part model, the repositioning plane is in the plane of the rectangle. Consequently, only one positioning parameter is required. In the case of angle dimensions associated with a 2-D part model, the arrow line is an arc between the two selected entities, and repositioning occurs in the plane of the arc by simply scaling the arc.

Once dimensions have been defined, they need to be saved. Therefore IDs of part entities containing the attachment points (to associate the part with the dimension) and the positioning parameters are saved to a file in memory or a diskette.

However, if two instances of a part are simultaneously saved in memory, e.g., the part is copied to another file, the IDs in both parts will be the same. Identical IDs present a problem when one instance of the part changes (e.g. rotated) because an ambiguous value is returned upon every reference to the ID. Thus, a sophisticated ID system is necessary for saving. An exemplary ID system that enables correctly saving the association between dimension components and the part data consist of two types of entity IDs: session IDs, and file IDs. Session IDs are attached to every entity at the time the part is loaded. Thus, session IDs are guaranteed to be unique within the session but may change when the session is closed and reopened. File IDs are also attached to each entity. However, the file IDs are permanent, do not depend on the IDs of other parts within a session and cannot be changed. Thus, the file IDs cannot change when the session is closed and reopened.

Figure 18:
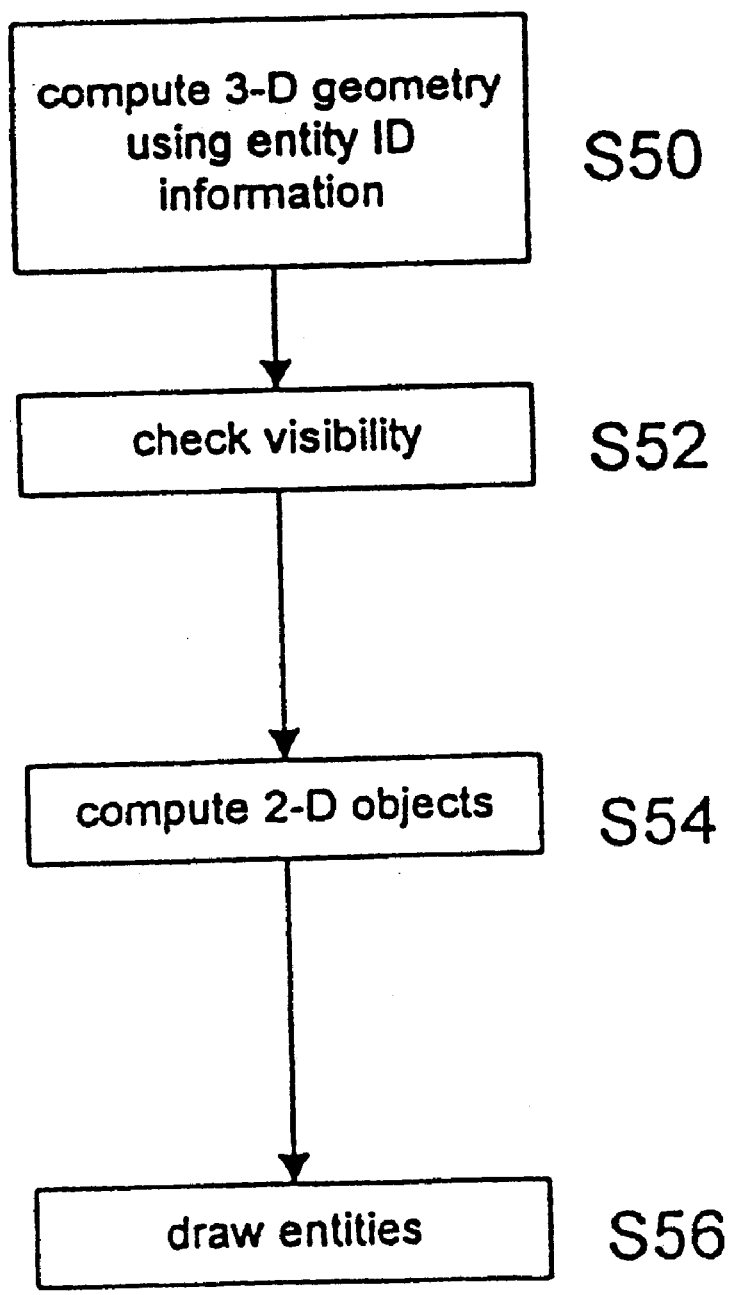
FIG. 18 is a general flow diagram showing the process of drawing a dimension, in accordance with an aspect of the present invention.

The various operations and processes that may be utilized for drawing the dimension are now discussed with reference to FIG. 18. At step S50, the 3-D lines are computed using ID information. The dimension object assigns an ID to every part entity and forwards the ID to the CAD system 10. When drawing the dimension, the dimension object uses the IDs to query the part entity's coordinates from the CAD tool 10. Consequently, whenever the part changes, the changes are reflected in the query result. Next, the distance between entities (i.e., dimension value 28), the geometry for the extension lines and the arrow line are all calculated in 3-D. At step S52 it is determined whether or not the attachment points to which the attachment lines extend from are visible. This visibility check is performed by a member function of the 3-D lines object as described above. At step S54, the 2-D lines, text and arrow heads are all computed. At step S56, Windows graphics device interface (GDI) functions may be called to draw the 2-D entities on top of the part.

Figure 24:
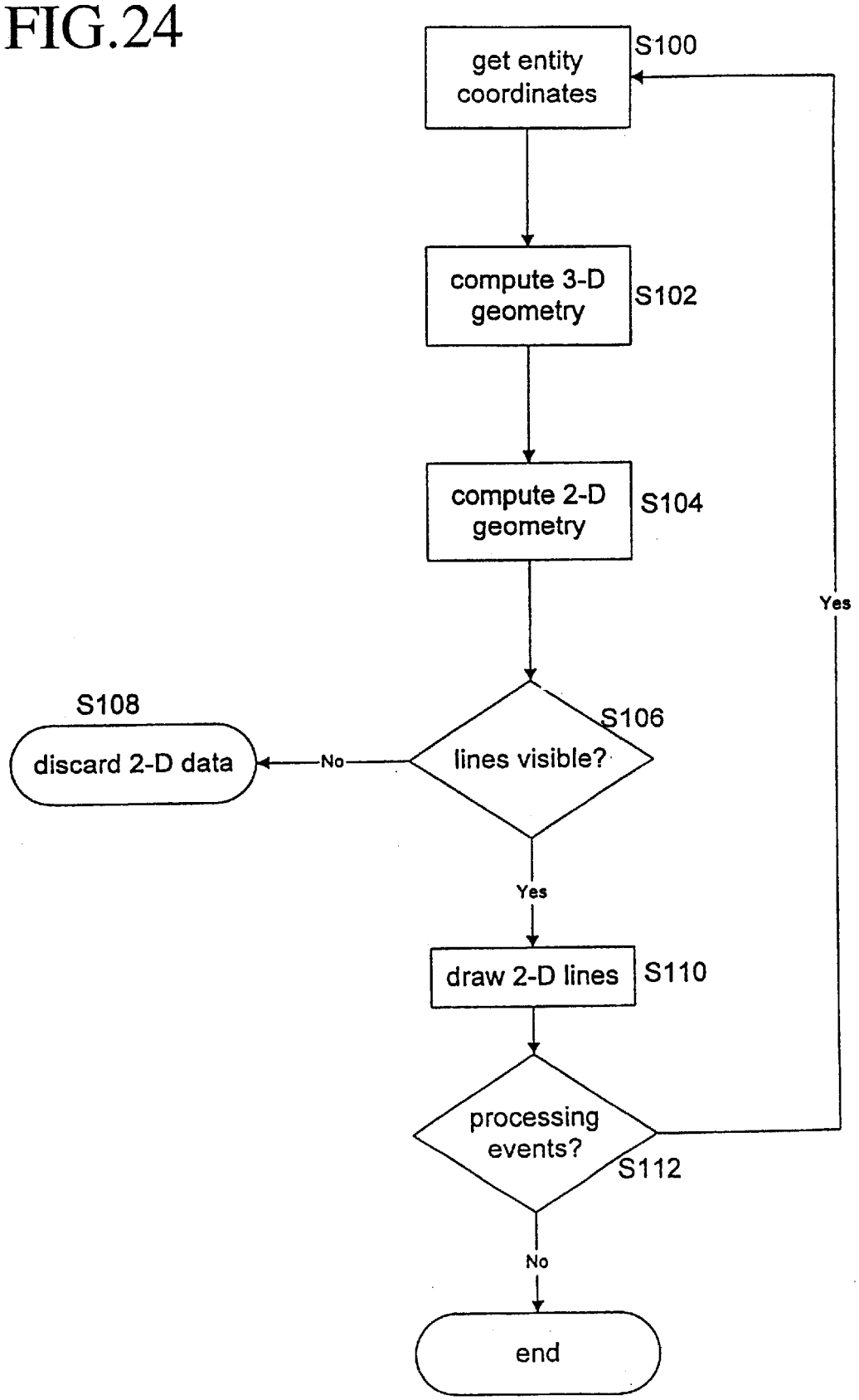
FIG. 24 is a general flow diagram of logic enabling constructing and drawing dimensions on a display screen, in accordance with an aspect of the present invention.

The process of creating and drawing a dimension is described with reference to the logic flow diagram shown in FIG. 24. At step S100, a function call is made to the dimensioning interface object to create a new dimension. The dimensioning interface object queries the BendCAD module 12 to find out the exact position (i.e., coordinates) of the entities selected. At step S102, the dimension object computes the 3-D geometry of the dimension, namely the 3-D coordinates of the arrow line 20, and extension lines 24, 26. At step S102, the dimension object also determines whether the data is defective, e.g., the attachment points disappear due to part data changes such as adding holes. In addition, the value 28 is computed. At step S104 the 2-D geometry of the invention is computed. The 2-D geometry is computed in order to project the 3-D lines onto the view plane. To compute the 2-D lines, each 3-D line is mapped to a single 2-D line. If the 3-D line describes an arrow line 20, arrows are added using new small line segments and stored in the 2-D arrows object. Also the bounding box of the text is computed and stored in the 2-D text object. The 2-D text information is computed for every 3-D line. However, the 2-D text information is hidden for all lines except the arrow line 20.

At step S106 it is determined whether the 2-D lines are visible. At step S108, the 2-D data for the whole dimension is hidden if the 2-D lines are not visible, or the 2-D data is discarded if the data is defective. However, when defining the dimension, the lines are always displayed. At step S110, if it is determined that the 2-D lines are visible at step S106, the 2-D lines are drawn at step S108. Then, at step S112 upon receiving processing events (e.g., zooming, rotating, panning, repositioning), the whole process repeats. Otherwise, the logic returns control to the calling function.

Another feature of the present invention allows the user to easily select between a far and close side of a part thickness. Because sheet metal has thickness, the user must decide which side of the sheet metal the dimension will be measured from. The far/close feature for deciding which side to measure from is now described with reference to FIGS. 15–17. After the dimension is defined, text on the screen near each attachment point indicates which side of the part thickness, i.e., far or close, is currently selected. For example, FIGS. 16 and 17 respectively illustrate far and close sides selected.

Figure 16:
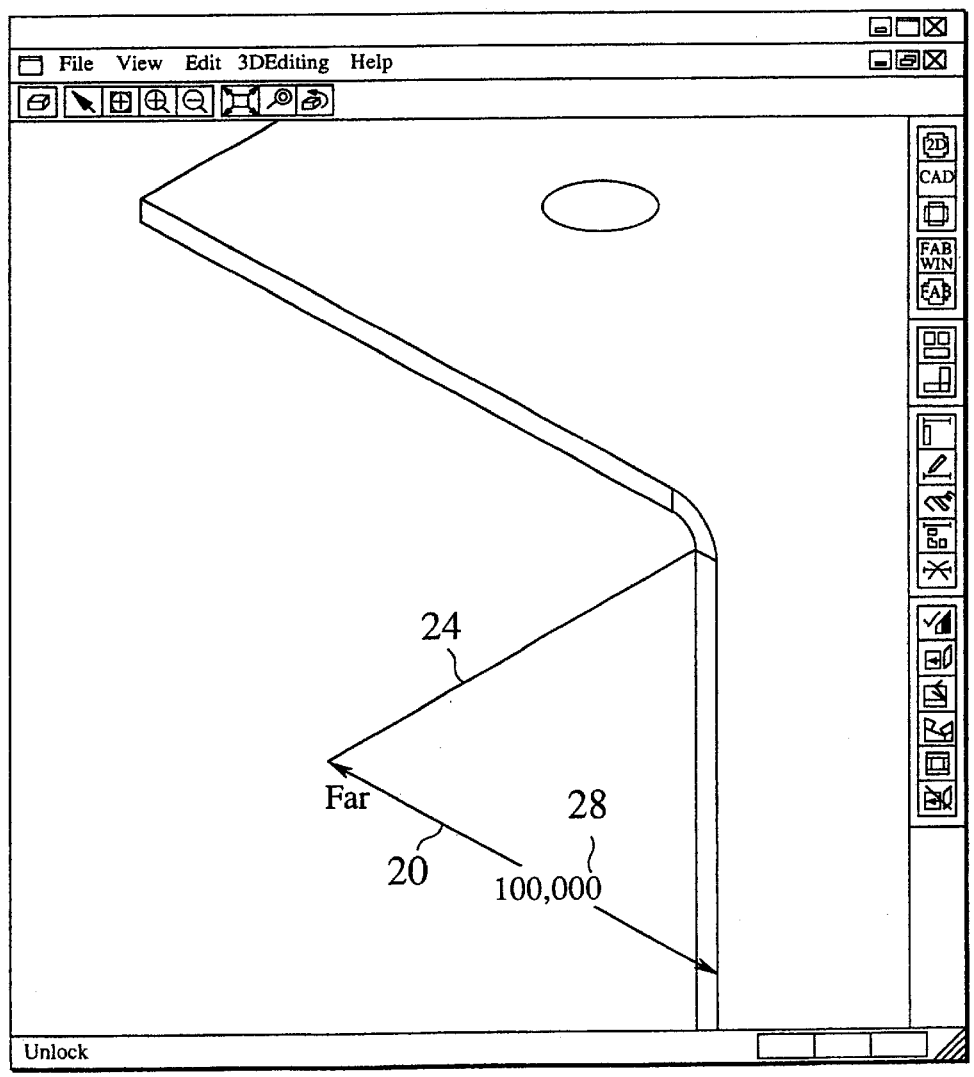
FIG. 16 is an enlarged view showing the relationship between the defined distance dimension and the part of FIG. 15 in a far configuration.
Figure 17:
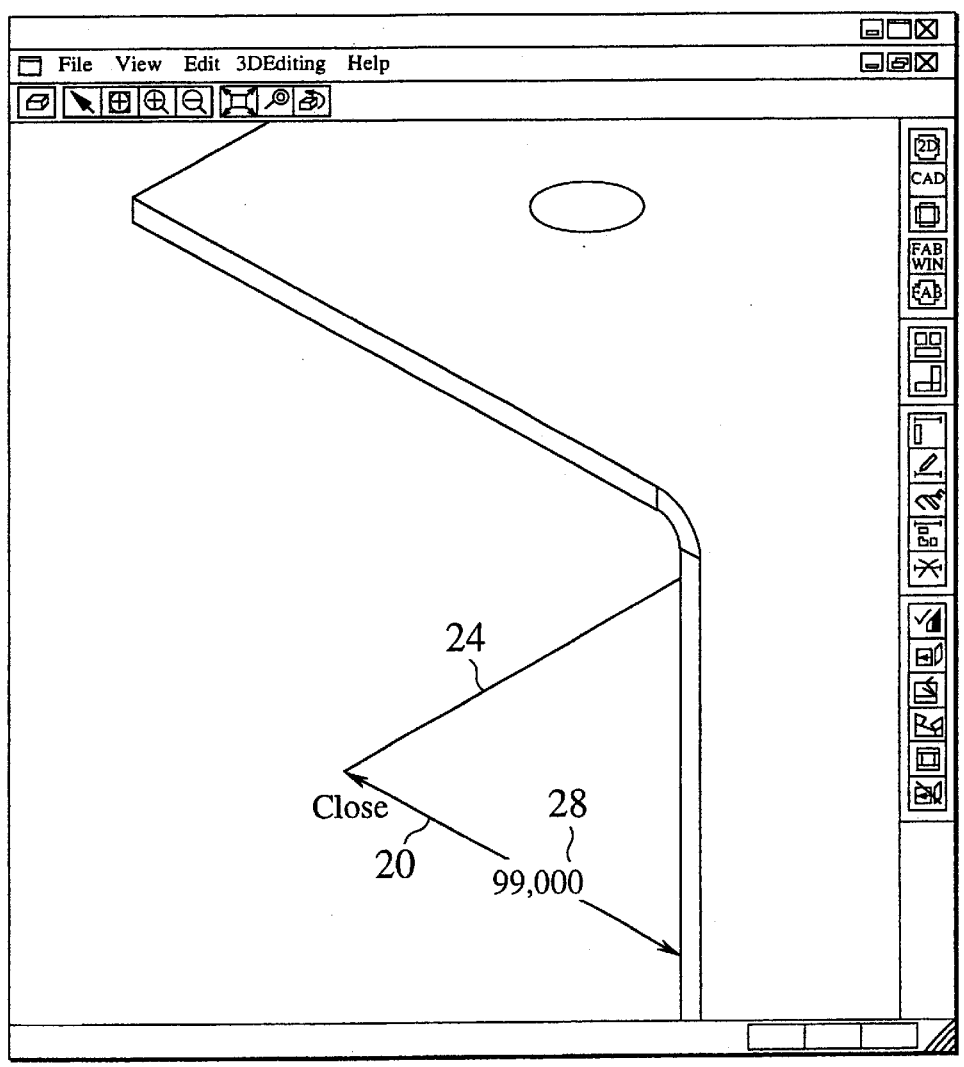
FIG. 17 is an enlarged view showing the relationship between the defined distance dimension and the part of FIG. 15 in a near configuration, in accordance with an aspect of the present invention.

In order to facilitate selection of the desired side to measure from, without tedious mouse manipulation or guesswork, the text display indicates far or close and can be easily switched by mouse button clicks. By placing the mouse cursor near the far text on the screen and clicking and releasing the mouse button, the attachment point switches from the far side to the close side, as seen in FIG. 17. If the text reads close, the user places the mouse cursor near the close text and clicks and releases the mouse button causing the attachment point to switch from the close side of the sheet metal to the far side, as shown in FIG. 16. As long as the part does not change, i.e., the bend angles vary, the far/close configuration remains the same.

Figure 15:
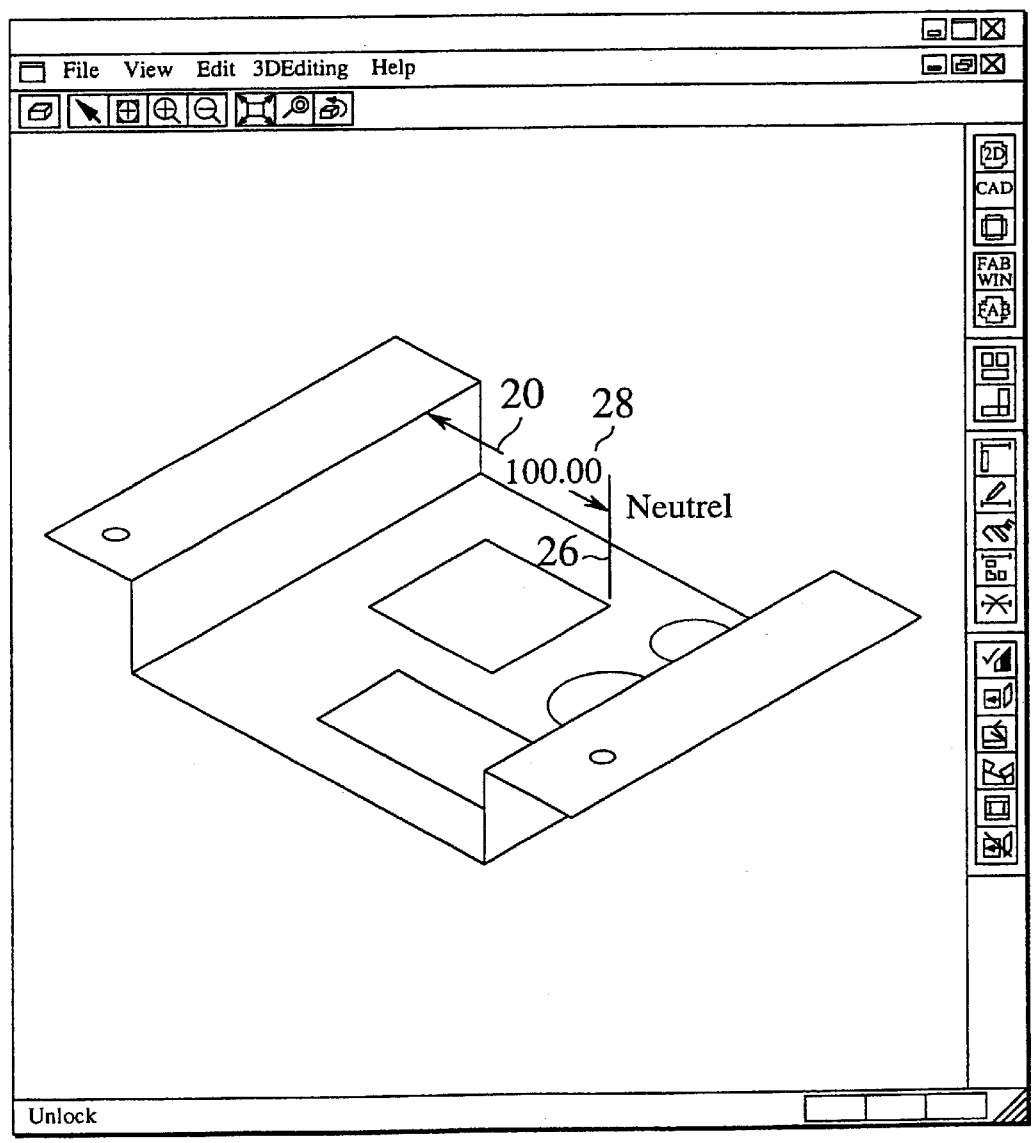
FIG. 15 illustrates a part along with a defined distance dimension having a neutral/close configuration.

The far/close configuration is determined by analyzing four measurement combinations (two different points, one for each side of the material's thickness for each attachment point) keeping one attachment point fixed and changing the other attachment point. When changing the attachment point, if the resulting measurement is longer, the far text is displayed. If the resulting measurement is shorter, the close text is displayed. In the case where no change of measurement distance occurs, text reading "neutral" is displayed, as shown in FIG. 15. Whenever the part changes, the far/close configuration must be recalculated. In a preferred embodiment, the dimension is initially displayed with both attachment points in the far configuration. The dimension class L1 is directly associated with the 2-D text class L4 for displaying the far/close/neutral text on the display screen.

Figure 21:
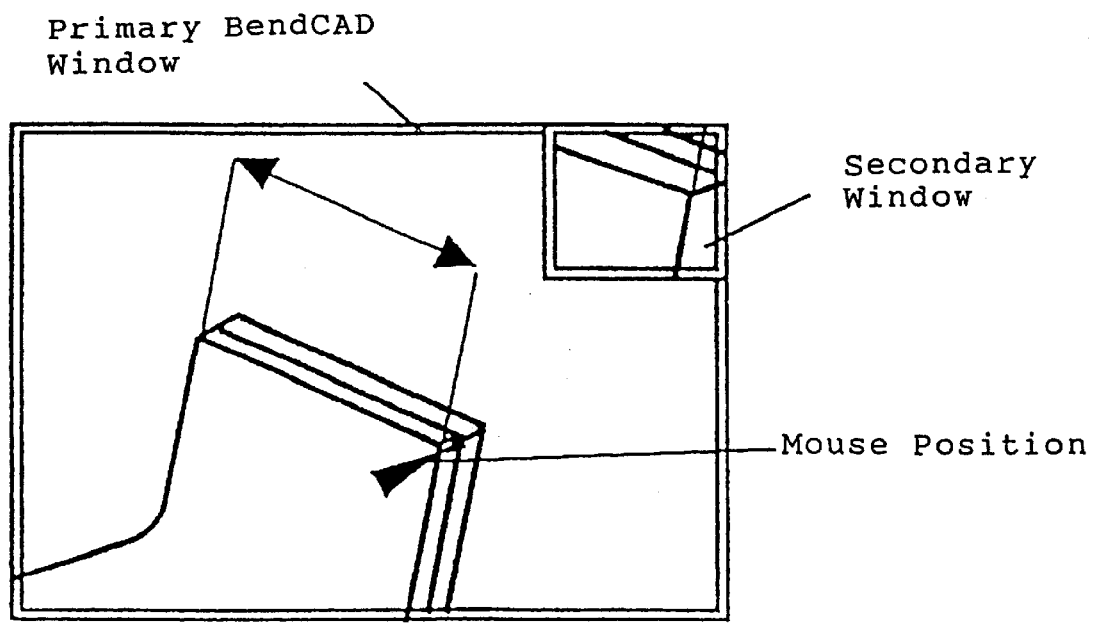
FIG. 21 illustrates a magnifying function and a corresponding child window, in accordance with an aspect of the present invention.

According to another preferred embodiment, a magnifying function may be provided. The magnifying function enables automatic zooming at the place where the mouse is pointing. A secondary window may be provided which enlarges a rectangular area around the mouse position as illustrated in FIG. 21. This zooming is useful to see the far/close dimension selections. In certain cases, automatic repositioning may be needed to fit the dimension into the secondary window.

Figure 22A:
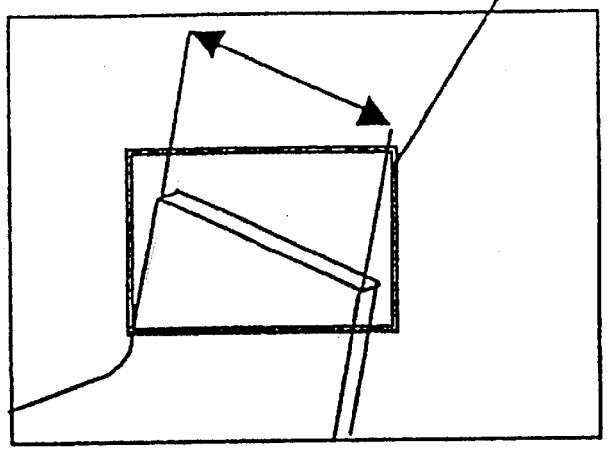
FIGS. 22a, 22b, and 22c illustrate the problem encountered when zooming in on a part, and remedial repositioning.
Figure 22B:
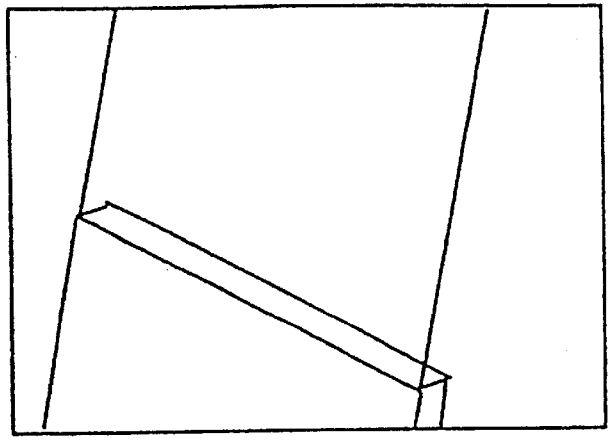
Figure 22C:
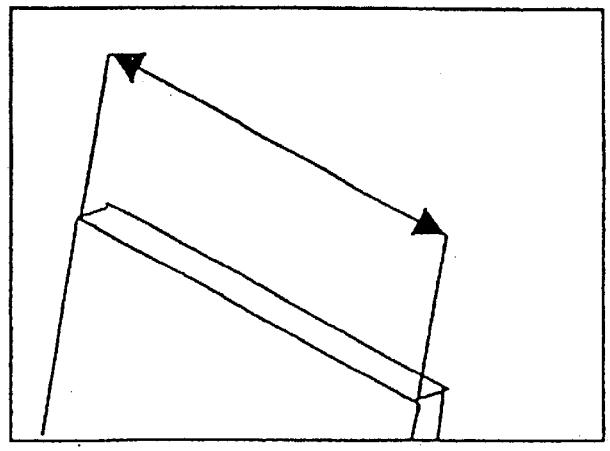

Automatic repositioning of the dimension may be necessary when a part is zoomed in upon, such that the attachment points are within the view port but the geometry of the dimension is not, as illustrated in FIGS. 22a and 22b. Thus, the dimension needs to be repositioned to fit within the view port. Such a repositioning involves the following two steps: 1) computing the 3-D points where the view port cuts the dimension; and 2) calculating the repositioning data according to where the dimension is cut. When the repositioning is performed, the updated view of the part with dimension information may be displayed, as shown in FIG. 22c.

According to another preferred embodiment, a tolerance display may be employed, as seen in FIG. 12, to indicate the tolerance values associated with the dimension. A user may access the tolerance menu by right clicking on a dimension. The tolerance menu may comprise a dialog box having a criticality field, an upper tolerance field and a lower tolerance field. Once in the tolerance dialog box, the user may select the dimension as being critical or select tolerance values to display with the dimension. Optionally, the user may also hide the dimension in which case the dimension is colored e.g., grey, so it does not appear as prominently. When a dimension is designated critical, it may preferably be drawn in a unique color, e.g., red. When the tolerances are selected, the dimension value is displayed with a plus and/or minus distance tolerance value(s).

Figure 19A:
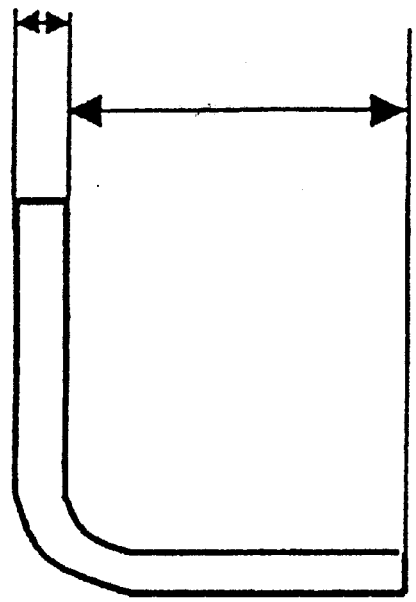
FIGS. 19a and 19b illustrate the use of a snapping function, in accordance with an aspect of the present invention.
Figure 19B:
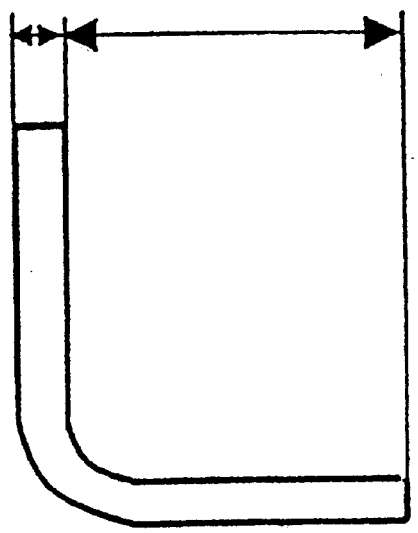

According to another preferred embodiment a snapping function may be provided. For example, assume two dimensions are defined as shown in FIG. 19a. It may be desirable to align the dimensions with respect to each other as illustrated in FIG. 19b. The aligning can be implemented by a 2-D snapping function. A similar 3-D snapping function may be provided for 3-D views of the part. Known algorithms may be utilized to implement the snapping feature.

According to a preferred embodiment, the dimensioning system may remember where and when to display dimensions according to the user's preferences. Thus, the user is able to select which dimensions are displayed to avoid unnecessarily cluttering the screen. Therefore, whenever the part is displayed, only the user selected dimensions are displayed with the part. Also if a dimension is positioned at one location when the part is rotated one way, and another position when the part is rotated another way (e.g., to avoid hiding a hole) the system remembers, for each rotated position, where to display the dimension.

Preferably, three separate ON/OFF toggle buttons are provided. The first button is a manual dimension display toggle button. Turning the manual dimension display toggle button ON displays all selected manually constructed and defined dimensions. Turning the manual dimension display toggle button OFF hides all manually constructed and defined dimensions. The second button switches between displaying and not displaying automatic dimensions. When both the first button and second button are ON, both manual and automatic dimensions are simultaneously displayed on the screen. The third button turns a dimension editing mode ON and OFF. In the dimension editing mode, the user may select any displayed dimension and reposition the dimension. When dimension editing mode is OFF, the dimensions may only be viewed and cannot be selected or moved.

While the invention has been described with reference to several exemplary embodiments, it is understood that the words which have been used herein are words of description and illustration, rather than words of limitation. Changes may be made, within the purview of the appended claims, as presently stated and as amended, without departing from the scope and spirit of the invention and its aspects. Although the invention has been described with reference to particular means, materials and embodiments, the invention is not intended to be limited to the particulars disclosed herein; rather, the invention extends to all functionally equivalent structures, methods and uses, such as are within the scope of the appended claims.

Figure 20:
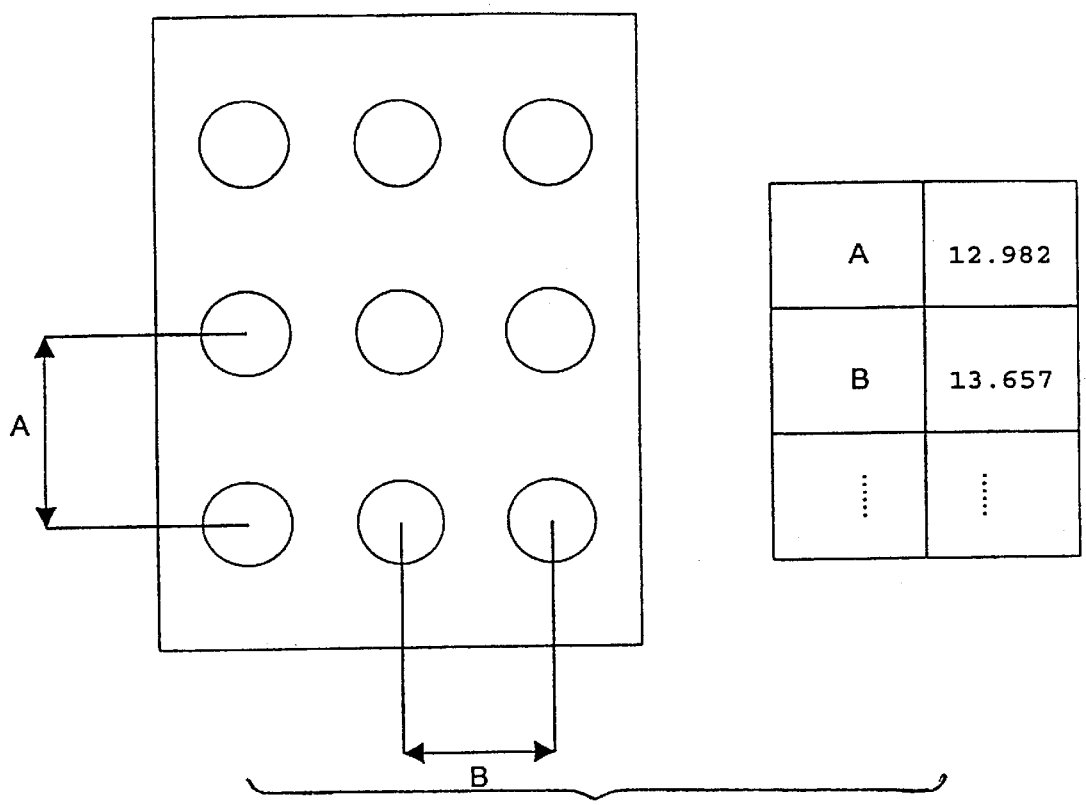
FIG. 20 illustrates the use of symbol dimensions, in accordance with an aspect of the present invention.

For example, although the system was described without reference to any drafting standards, the system can be easily modified to comply with drafting standards such as ISO 9000 or ANSI/ASME Y14.5M-1194 by changing the text and the shape of the 2-D and 3-D lines. Moreover, although the dimension value 28 was described as a numerical value displayed on the screen, the value may be easily modified to be a symbol. For example, when several dimensions having equivalent relationships are displayed, displaying a symbol may be more desirable than displaying the numerical value to reduce clutter on the screen. When a symbol is displayed, a table of symbol/value assignments preferably is drawn separately. FIG. 20 shows an example of a symbol dimension. Thus, the symbol dimension allows describing repetitive relationships between holes, notches, etc. The symbol dimension feature also allows specifying that certain dimensions are equal.

Figure 23A:
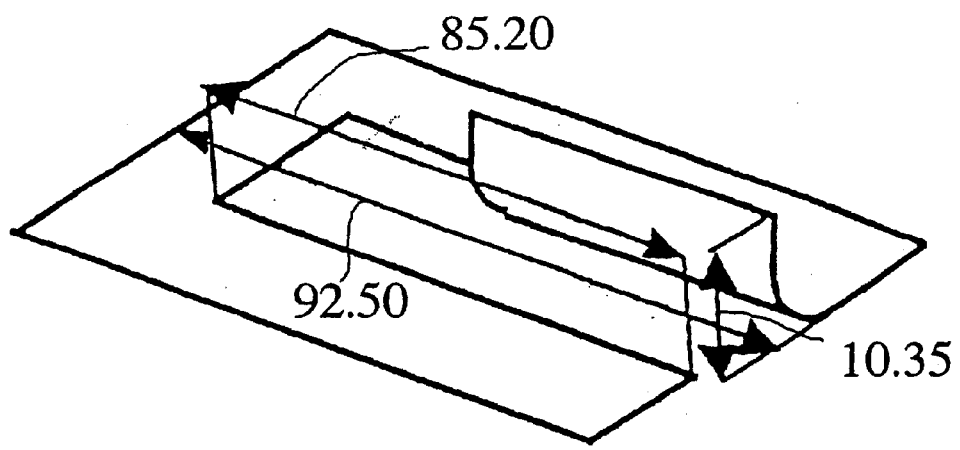
FIGS. 23a and 23b illustrate a cluttered screen and remedial repositioning.
Figure 23B:
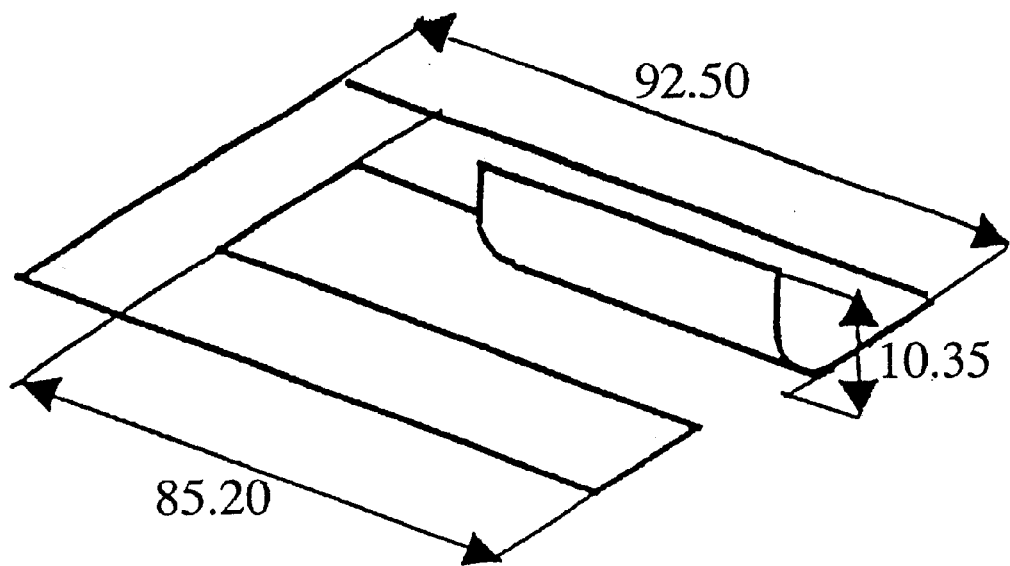

Furthermore, although repositioning has been described as user enabled or being in response to zooming, the dimensioning system may reposition on its own to reduce screen clutter as shown in FIG. 23a. To avoid clutter on the screen the dimension needs to be repositioned to prevent overlapping. After repositioning, the dimensions should be configured as shown in FIG. 23b. To accomplish the repositioning for avoiding screen clutter, a three step process is executed. First, for each dimension a list of candidate text positions is generated. Second, a configuration of the text position such that the overlapping of other dimensions and the part is minimized is selected. Third, the 3-D geometry of the dimension that enables positioning the text as selected in the second step is computed.

Automatic repositioning may also be used with the present invention to improve the clarity of the displayed dimension information. When the user specifies the position of a preferred dimension, the position may not be visible. Automatic repositioning involves computing the position of each dimension so that the clarity is maximized. The priorities are first, try to show every dimension having attachment points (or entities) within the view port. Second, try to reposition the text to avoid overlapping with other text or dimensions. Third, avoid overlapping with the entities being dimensioned (i.e., this may require rotating the part by 90°).

In addition the system may reposition dimensions to maintain consistency between 2-D view perspectives, and 3-D view perspectives. Thus, when a dimension is repositioned in 2-D, it is automatically displayed at that same relative position in the 3-D model. Moreover, if a plurality of views angles are simultaneously shown on the display screen and a dimension is defined in one view, the dimension should appear on other view.

What is claimed:

1. A dimensioning system for a computer generated geometric model including a plurality of entities, the dimensioning system comprising:
    a selector which selects two entities of the model, the selector comprising an attachment point selector which selects an attachment point corresponding to each selected entity; and
    a dimension defining system which defines each dimension associated with the selected entities of the model, the dimension defining system comprising a cuboid generator which generates a cuboid defined by the selected attachment points as opposite diagonal corners of the cuboid, the dimension between the attachment points being defined as one of a straight line connecting the attachment points and as three adjacent edges of the cuboid, the three adjacent edges connecting the attachment points.

2. The dimensioning system of claim 1, further comprising an indicator which indicates to a user candidate entities of the model, in response to user events, that may be selected, and wherein each entity is selected based on an indicated candidate entity.

3. The dimensioning system of claim 1, further comprising a model display which displays a representation of the model on a display screen, and a dimension display which displays dimension information on the display screen based on the defined dimension.

4. The dimensioning system of claim 1, wherein the geometric model comprises a 3-D sheet metal part model.

5. The dimensioning system of claim 4, the selector comprising a line calculator which calculates two lines, one for each selected entity, each line representing one of the two selected entities, and the dimension display comprising a cylinder generator which generates a cylinder based upon the two lines, wherein the dimension between the selected entities comprises an angle measured between the two lines, and wherein a dimension information component is displayed on a portion of a perimeter of the cylinder.

6. The dimensioning system of claim 4, further comprising a picking order system which assigns priorities to the plurality of entities of the model and a predefined dimension of the model and, based upon the assigned priorities, picks either one of the plurality of entities of the model or the predefined dimension as a target for selecting, such that if the target is an entity of the model, the target is the candidate entity.

7. The dimensioning system of claim 1, the dimension display comprising a visibility checker which checks whether both attachment points are visible from a user selected perspective of the model, wherein the dimension information is only displayed if one of the attachment points is determined to be visible from the user selected perspective.

8. A dimensioning system for a computer generated geometric model including a plurality of entities, the dimensioning system comprising:
    a selector which selects two entities of the model, the geometric model comprising a 3-D sheet metal part model;
    a dimension defining system which defines each dimension associated with the selected entities of the model;
    a picking order system which assigns priorities to the plurality of entities of the model and a predefined dimension of the model and, based upon the assigned priorities, picks either one of the plurality of entities of the model or the predefined dimension as a target for selecting, such that if the target is an entity of the model, the target is the candidate entity; and
    a filter which prevents an undesirable one of the plurality of entities or predefined dimension from becoming the target.

9. The dimensioning system of claim 4, the dimension display comprising a visibility checker which checks whether both attachment points are visible from a user selected perspective of the model, wherein the dimension information is only displayed if one of the attachment points is determined to be visible from the user selected perspective.

10. A dimensioning system for a computer generated geometric model including a plurality of entities, the dimensioning system comprising:
    a selector which selects two entities of the model, the geometric model comprising a 3-D sheet metal part model;
    a dimension defining system which defines each dimension associated with the selected entities of the model; and
    a display which displays dimension information comprising text and an arrow line, the display further comprising a text repositioner which repositions the text to be centered relative to a portion of the arrow line visible from the user selected perspective.

11. The dimensioning system of claim 4, in which the user events comprise mouse movement events.

12. The dimensioning system of claim 11, the plurality of entities comprising bend lines, faces and formings.

13. A method for selecting and displaying dimensions for a computer generated geometric model including a plurality of entities, the method comprising:
    displaying a representation of the model on a display screen;
    indicating to a user candidate entities of the model in response to user events;
    selecting two entities of the model represented on the display screen, each entity being based on an indicated candidate entity;
    defining dimensions associated with the selected entities of the model;
    displaying, along with the model, the dimension information on the display screen, based on the defined dimension; and representing a sheet metal thickness in the model, wherein the defining further comprises selecting a side of the thickness from which to measure the dimension.

14. The method of claim 13, in which the geometric model comprises 3-D sheet metal part model.

15. The method of claim 14, the defining comprising:
defining the dimension as either an angle between the selected entities or as a distance between the selected entities;
selecting, if the dimension is defined as the distance between the selected entities, a measurement axis along which to measure the distance; and
selecting, if the dimension is defined as an angle between the selected entities, either an obtuse measuring angle or an acute measuring angle.

16. The method of claim 15, in which if the dimension is defined as the distance between the selected entities, the selecting further comprises selecting an attachment point corresponding to each selected entity, and defining dimensions further comprises generating a cuboid defined by the selected attachment points as opposite diagonal corners of the cuboid, the dimension between the attachment points being defined as either a straight line connecting the attachment points or as three adjacent edges of the cuboid, the three adjacent edges connecting the attachment points; and wherein if the dimension is defined as an angle, the selecting further comprises calculating two lines, one for each selected entity, each line representing one of the two selected entities, and displaying the dimension further comprises generating a cylinder based upon the two lines, wherein the dimension between the two selected entities comprises an angle measured between the two lines, and wherein a dimension information component is displayed on a portion of a perimeter of the cylinder.

17. A method for selecting and displaying dimensions for a computer generated geometric model including a plurality of entities, the method comprising:
displaying a representation of the model on a display screen, the geometric model comprising a 3-D sheet metal part model;
indicating, to a user candidate, entities of the model in response to user events;
selecting two entities of the model represented on the display screen, each entity being based on an indicated candidate entity;
defining dimensions associated with the selected entities of the model;
displaying, along with the model, the dimension information on the display screen, based on the defined dimension; and
representing a sheet metal thickness in the model, wherein the defining further comprises selecting a side of the thickness from which to measure the dimension.

18. The method of claim 14, in which the user events comprise mouse movement events.

19. The method of claim 14, the plurality of entities comprising bend lines, faces and formings.

20. A dimensioning system for a computer generated geometric model including a plurality of entities, the geometric model comprising a sheet metal part model, the dimensioning system comprising:
a selector which selects two entities of the model, the selector comprising an attachment point selector which selects an attachment point corresponding to each selected entity,
a dimension defining system which defines each dimension associated with the selected entities of the model, the dimension defining system comprising a rectangle generator which generates a rectangle defined by the selected attachment points as opposite diagonal corners of the rectangle, the dimension between the attachment points being defined as either a straight line connecting the attachment points or as two adjacent edges of the rectangle, the two adjacent edges connecting the attachment points;
an indicator which indicates, to a user, candidate entities of the model, in response to user events, that may be selected, each entity being selected based on an indicated candidate entity;
a model display which displays a representation of the model on a display screen; and
a dimension display which displays dimension information on the display screen based on the defined dimension.

21. The dimensioning system of claim 20, further comprising a picking order system which assigns priorities to the plurality of entities of the model and a predefined dimension of the model and, based upon the assigned priorities, picks either one of the plurality of entities of the model or the predefined dimension as a target for selecting, such that if the target is an entity of the model, the target is the candidate entity.

22. The dimensioning system of claim 20, the dimension display comprising a visibility checker which checks whether both attachment points are visible from a user selected perspective of the model, wherein the dimension information is only displayed if one of the attachment points is determined to be visible from the user selected perspective.

23. The method of claim 13, in which the geometric model comprises a sheet metal part model.

24. The method of claim 23, the defining comprising:
defining the dimension as either an angle between the selected entities or as a distance between the selected entities;
selecting, if the dimension is defined as the distance between the selected entities, a measurement axis along which to measure the distance; and
selecting, if the dimension is defined as an angle between the selected entities, either an obtuse measuring angle or an acute measuring angle.

25. A dimensioning system for a computer generated geometric model including a plurality of entities, the dimensioning system comprising:
a selector which selects two entities of the geometric model, the geometric model comprising a sheet metal part model;
a dimension defining system which defines each dimension associated with the selected entities of the model as either an angle between the selected entities or as a distance between the selected entities; and
a selecting system that selects, when the dimension is defined as the distance between the selected entities, a measurement axis along which to measure the distance; and selects, when the dimension is defined as an angle between the selected entities, either an obtuse measuring angle or an acute measuring angle;
wherein when the dimension is defined as the distance between the selected entities, the selecting system further selects an attachment point corresponding to each selected entity, and the dimension defining system further generates a rectangle defined by the selected attachment points as opposite diagonal corners of the rectangle, the dimension between the attachment points being defined as either a straight line connecting the attachment points or as two adjacent edges of the rectangle, the two adjacent edges connecting the attachment points;

wherein when the dimension is defined as an angle, the selecting system calculates two lines, one for each selected entity, each line representing one of the two selected entities; and wherein the dimension between the two selected entities comprises an angle measured between the two lines and a component of the dimension information is displayed as an arc between the two lines.

26. A dimensioning system for a computer generated geometric model including a plurality of entities, the geometric model comprising a sheet metal part model, the dimensioning system comprising:

a selector which selects two entities of the model;

a dimension defining system which defines each dimension associated with the selected entities of the model;

an indicator which indicates, to a user, candidate entities of the model, in response to user events, that may be selected, each entity being selected based on an indicated candidate entity;

a model display which displays a representation of the model on a display screen;

a dimension display which displays dimension information on the display screen based on the defined dimension; and a picking order system which assigns priorities to the plurality of entities of the model and a predefined dimension of the model and, based upon the assigned priorities, picks either one of the plurality of entities of the model or the predefined dimension as a target for selecting, such that if the target is an entity of the model, the target is the candidate entity.

* * * * *